(12) United States Patent
Chu et al.

(10) Patent No.: US 12,339,968 B2
(45) Date of Patent: Jun. 24, 2025

(54) STORAGE DEVICE AND OPERATING METHOD OF STORAGE DEVICE

(71) Applicant: Samsung Electronics Co., Ltd., Suwon-si (KR)

(72) Inventors: Younsung Chu, Yongin-si (KR); Jisoo Kim, Seongnam-si (KR); Youngtak Noh, Daegu (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 483 days.

(21) Appl. No.: 17/842,216

(22) Filed: Jun. 16, 2022

(65) Prior Publication Data
US 2023/0153441 A1 May 18, 2023

(30) Foreign Application Priority Data
Nov. 18, 2021 (KR) .................. 10-2021-0159165

(51) Int. Cl.
*G06F 21/00* (2013.01)
*G06F 21/31* (2013.01)
(Continued)

(52) U.S. Cl.
CPC ............ *G06F 21/575* (2013.01); *G06F 21/31* (2013.01); *G06F 21/602* (2013.01); *G06F 21/79* (2013.01)

(58) Field of Classification Search
CPC ...... G06F 21/575; G06F 21/31; G06F 21/602; G06F 21/79; G06F 21/44; G06F 3/0629;
(Continued)

(56) References Cited

U.S. PATENT DOCUMENTS 7,529,919 B2 * 5/2009 Lampson ............ H04L 63/0435
713/1
7,587,611 B2 9/2009 Johnson et al.
(Continued)

FOREIGN PATENT DOCUMENTS

KR 10-2011-0022694 A 3/2011
KR 10-2020-0032920 A 3/2020

OTHER PUBLICATIONS

"Hardware Requirements for a Device Identifier Composition Engine," TCG published, Mar. 22, 2018.
(Continued)

*Primary Examiner* — Kendall Dolly
(74) *Attorney, Agent, or Firm* — Harness, Dickey & Pierce, P.L.C.

(57) ABSTRACT

Disclosed is a storage device which includes a nonvolatile memory device that stores booting data and user data, and a memory controller that includes a first core, a second core, and third cores. In an initialization operation, the first core performs first authentication on at least a first part of the booting data. In response to that the first authentication succeeds, the first core generates a device identifier, and the second core loads the first part of the booting data and performs first booting. The first core performs second authentication on at least a second part of the booting data. In response to that the second authentication succeeds, the first core generates a first certificate and a second certificate, and the second core loads the second part of the booting data and performs second booting.

19 Claims, 16 Drawing Sheets

(51) Int. Cl.
*G06F 21/57* (2013.01)
*G06F 21/60* (2013.01)
*G06F 21/79* (2013.01)

(58) Field of Classification Search
CPC ... G06F 3/0679; G06F 9/4451; G06F 9/44521
See application file for complete search history.

(56) References Cited

U.S. PATENT DOCUMENTS

| | | | | |
|---|---|---|---|---|
| 7,953,980 | B2* | 5/2011 | Schluessler | G06F 21/54 |
| | | | | 713/180 |
| 8,443,203 | B2* | 5/2013 | Park | G06F 21/575 |
| | | | | 713/187 |
| 10,211,985 | B1* | 2/2019 | Brandwine | H04L 9/3239 |
| 10,708,064 | B2 | 7/2020 | Nagano et al. | |
| 10,992,482 | B2* | 4/2021 | Deymonnaz | H04L 63/0823 |
| 11,042,644 | B2* | 6/2021 | Sheng | G06F 9/4405 |
| 11,062,032 | B2 | 7/2021 | Shah et al. | |
| 11,170,110 | B2* | 11/2021 | Kim | G06F 21/575 |
| 2005/0076228 | A1* | 4/2005 | Davis | G06F 21/73 |
| | | | | 713/188 |
| 2009/0249053 | A1* | 10/2009 | Zimmer | G06F 9/45558 |
| | | | | 713/2 |
| 2011/0091039 | A1 | 4/2011 | Spitz et al. | |
| 2016/0378507 | A1* | 12/2016 | Gupta | G06F 9/4401 |
| | | | | 713/2 |
| 2018/0373878 | A1* | 12/2018 | Jung | H04L 9/0894 |
| 2019/0095220 | A1* | 3/2019 | Iyengar | G06F 9/4405 |
| 2019/0319796 | A1 | 10/2019 | Ghosh et al. | |
| 2020/0084042 | A1* | 3/2020 | Nelson | H04L 9/0894 |
| 2020/0089889 | A1* | 3/2020 | Kim | G06F 21/6209 |
| 2023/0008885 | A1* | 1/2023 | Khatri | G06F 21/602 |
| 2025/0053659 | A1* | 2/2025 | Asbe | H04L 9/30 |

OTHER PUBLICATIONS

825e3beb6c6efcd8c35506d818c18d1 e73b9834a—open-dice—Git at Google,, Jul. 12, 2022 (Jul. 12, 2022), Retrieved from the Internet:URL:https://pigweed.googlesource.com/open-dice/+/825e3beb6c6efcd8c35506d818c18d1e73b9834a.

* cited by examiner

STORAGE DEVICE AND OPERATING METHOD OF STORAGE DEVICE

CROSS-REFERENCE TO RELATED APPLICATIONS

This application claims priority under 35 U.S.C. § 119 to Korean Patent Application No. 10-2021-0159165 filed on Nov. 18, 2021, in the Korean Intellectual Property Office, the disclosures of which are incorporated by reference herein in their entireties.

BACKGROUND

Embodiments of the present disclosure described herein relate to an electronic device, and more particularly, relate to a storage device improving an operating speed together with the improvement of security based on authentication, measurement, and attestation; and an operating method of the storage device.

A storage device refers to a device that stores data under control of a host device, such as a computer, a smartphone, and/or a smart pad. The storage device may be and/or include a device that stores data on a magnetic disk, such as a hard disk drive (HDD), and/or a device that stores data in a semiconductor memory, such as, a nonvolatile memory, a solid state drive (SSD), and/or a memory card.

Electronic devices used in daily life include storage devices. The storage devices are used to store various data generated and/or collected by the user. Accordingly, data that require security, such as personal information and/or business information of the user, may be stored in the storage device.

When the storage device is hacked by the other person and/or entity, the data stored in the storage device may be exposed. Accordingly, means for increasing the security of the storage devices is being variously developed and is being mounted in the storage devices. However, mounting the security means in the storage device may hinder an operating speed of the storage device.

SUMMARY

Embodiments of the present disclosure provide a storage device increasing a booting speed and supporting improved security and an operating method of the storage device.

According to an embodiment, a storage device includes a nonvolatile memory device that stores booting data and user data, and a memory controller including a first core, a second core, and third cores. The memory controller may be configured such that, in an initialization operation, the first core is configured to perform a first authentication on a first part of the booting data; in response to the first authentication succeeding, the first core is configured to generate a device identifier, and the second core is configured to load the first part of the booting data and perform a first booting; the first core is configured to perform second authentication on at least a second part of the booting data; and, in response to that the second authentication succeeding, the first core is configured to generate a first certificate and a second certificate, and the second core is configured to load the second part of the booting data and to perform a second booting.

According to an embodiment, an operating method of a storage device which includes a nonvolatile memory device and a memory controller configured to control the nonvolatile memory device and including a plurality of cores includes authenticating, at a first core of the plurality of cores, booting data stored in the nonvolatile memory device; generating, at the first core of the plurality of cores, a first certificate and a second certificate by measuring at least a part of the booting data stored in the nonvolatile memory device; and loading, at a second core of the plurality of cores, the booting data stored in the nonvolatile memory device.

According to an embodiment, an operating method of a storage device which includes a nonvolatile memory device and a memory controller configured to control the nonvolatile memory device and including a plurality of cores includes authenticating, at a first core of the plurality of cores, a first security code and a boot loader code of booting data stored in the nonvolatile memory device; when the authentication of the first security code and the boot loader code succeeds, generating, at the first core of the plurality of cores, a device identifier based on a result of measuring the first security code and the boot loader code; when the authentication of the first security code and the boot loader code succeeds, loading, at a second core of the plurality of cores, the first security code and the boot loader code from the nonvolatile memory device onto the first core and the second core, respectively; authenticating, at the first core of the plurality of cores, a second security code and firmware codes of the booting data; when the authentication of the second security code and the firmware codes succeeds, generating, at the first core of the plurality of cores, a first certificate from the device identifier based on the first security code, measuring, at the first core of the plurality of cores, the second security code, and generating a second certificate from the device identifier and a measurement result of the second security code, when the authentication of the second security code and the firmware codes succeeds, loading, at the second core of the plurality of cores, the second security code from the nonvolatile memory device onto the first core and the firmware codes onto the second core and a remainder of the plurality of cores based on the boot loader code; executing, at the second core and the remainder of the plurality of cores, the loaded firmware codes; and performing, at the first core, attestation of the loaded firmware codes.

BRIEF DESCRIPTION OF THE FIGURES

The above and other objects and features of the present disclosure will become apparent by describing in detail some example embodiments thereof with reference to the accompanying drawings.

DETAILED DESCRIPTION

Below, embodiments of the present disclosure may be described in detail and clearly to such an extent that an ordinary one in the art easily implements the present disclosure. Below, the term "and/or" is interpreted as including any one of items listed with regard to the term, or a combination of some of the listed items.

Figure 1:
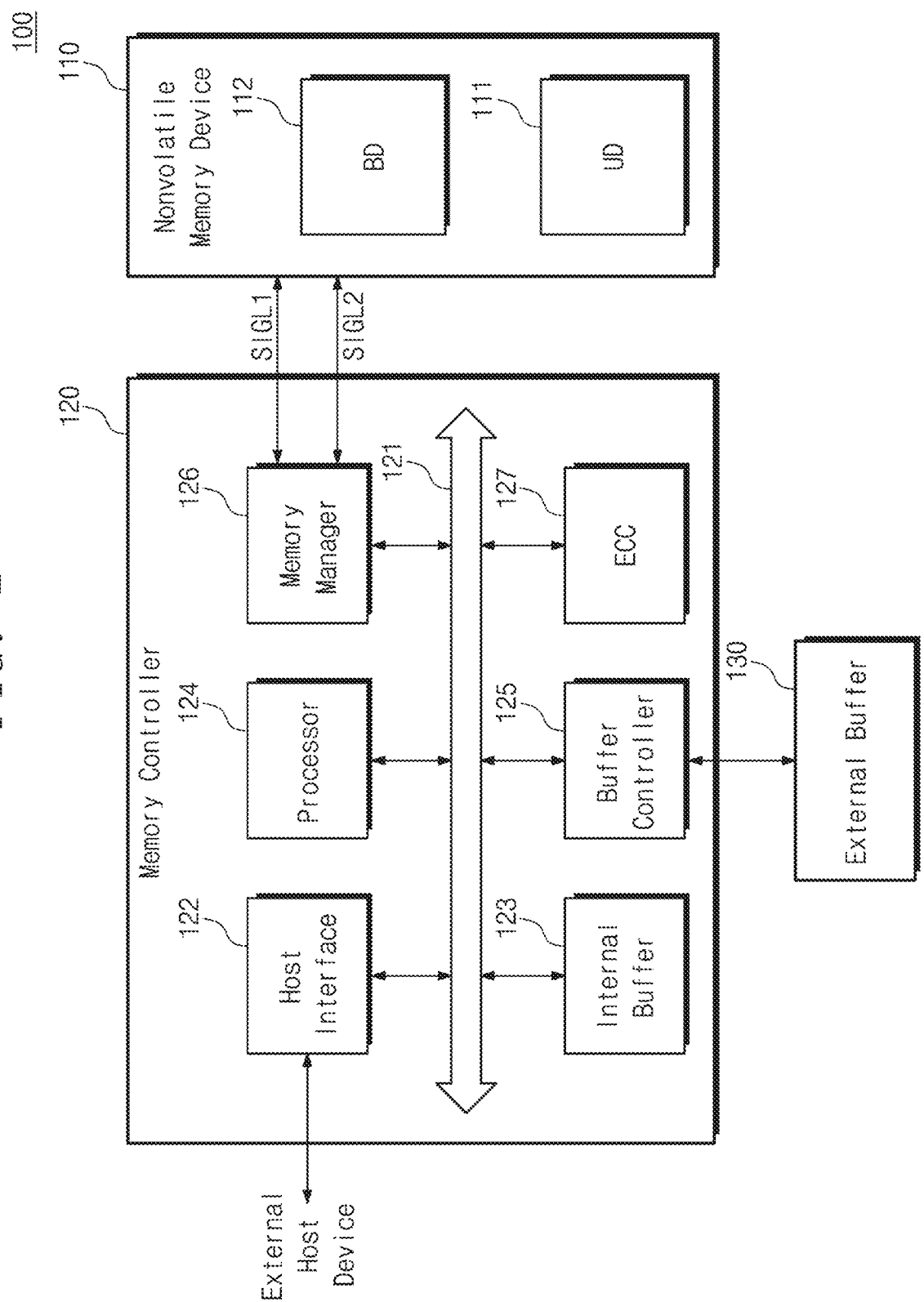
FIG. 1 illustrates a storage device according to some example embodiments of the present disclosure.

FIG. 1 illustrates a storage device 100 according to some example embodiments of the present disclosure. Referring to FIG. 1, the storage device 100 may include a nonvolatile memory device 110, a memory controller 120, and an external buffer 130. The nonvolatile memory device 110 may include a plurality of memory cells. In some example embodiments, each of the plurality of memory cells may store two or more bits.

The nonvolatile memory device 110 may include at least one type of nonvolatile memory device, such as a flash memory device, a phase change memory device, a ferroelectric memory device, a magnetic memory device, a resistive memory device, and/or the like.

The nonvolatile memory device 110 may include a first region 111 and a second region 112. The first region 111 may be used to store user data UD. The user data UD may refer to data that are write-requested by, e.g., an external host device. The second region 112 may be used to store booting data BD. The booting data BD may refer to data that are used to initialize the storage device 100 and to drive the storage device 100.

The memory controller 120 may receive various requests for writing data in the nonvolatile memory device 110 and/or reading data from the nonvolatile memory device 110 from the external host device. The memory controller 120 may store (and/or buffer) user data, which are transmitted/received to/from the external host device, in the external buffer 130 and may store metadata for managing the storage device 100 in the external buffer 130.

The memory controller 120 may access the nonvolatile memory device 110 through first signal lines SIGL1 and/or second signal lines SIGL2. For example, the memory controller 120 may transmit a command and an address to the nonvolatile memory device 110 through the first signal lines SIGL1. The memory controller 120 may exchange data with the nonvolatile memory device 110 through the first signal lines SIGL1.

The memory controller 120 may transmit a first control signal to the nonvolatile memory device 110 through the second signal lines SIGL2. The memory controller 120 may receive a second control signal from the nonvolatile memory device 110 through the second signal lines SIGL2.

In some example embodiments, the memory controller 120 may be configured to control two or more nonvolatile memory devices. The memory controller 120 may provide first signal lines and second signal lines for each of the two or more nonvolatile memory devices, and/or the memory controller 120 may share the first signal lines with respect to the two or more nonvolatile memory devices. The memory controller 120 may share some of the second signal lines with respect to the two or more nonvolatile memory devices and may separately provide the others thereof.

The external buffer 130 may be and/or include a random access memory (RAM). For example, the external buffer 130 may include at least one of a dynamic random access memory, a phase change random access memory, a ferroelectric random access memory, a magnetic random access memory, a resistive random access memory, and/or the like.

The memory controller 120 may include a bus 121, a host interface 122, an internal buffer 123, a processor 124, a buffer controller 125, a memory manager 126, and an error correction code (ECC) block 127.

The bus 121 may provide communication channels between the components in the memory controller 120. The host interface 122 may receive various requests from the external host device and may parse the received requests. The host interface 122 may store the parsed requests in the internal buffer 123.

The host interface 122 may also transmit various responses to the external host device. The host interface 122 may exchange signals with the external host device, e.g., in compliance with a given communication protocol. The internal buffer 123 may include a random access memory. For example, the internal buffer 123 may include RAM, such as a static random access memory, a dynamic random access memory, and/or the like.

The processor 124 may drive an operating system or firmware for an operation of the memory controller 120. The processor 124 may read the parsed requests stored in the internal buffer 123 and may generate commands and addresses for controlling the nonvolatile memory device 110. The processor 124 may provide the generated commands and addresses to the memory manager 126.

The processor 124 may store various metadata for managing the storage device 100 in the internal buffer 123. The processor 124 may access the external buffer 130 through the buffer controller 125. The processor 124 may control the buffer controller 125 and the memory manager 126 such that user data stored in the external buffer 130 are provided to the nonvolatile memory device 110.

The processor 124 may control the host interface 122 and the buffer controller 125 such that the data stored in the external buffer 130 are provided to the external host device. The processor 124 may control the buffer controller 125 and the memory manager 126 such that data received from the nonvolatile memory device 110 are stored in the external buffer 130. The processor 124 may control the host interface 122 and the buffer controller 125 such that data received from the external host device are stored in the external buffer 130.

Under control of the processor 124, the buffer controller 125 may write data in the external buffer 130 and/or may read data from the external buffer 130. Though the buffer controller 125 is illustrated as included in the memory controller 120, the example embodiments are not limited thereto. For example, in some example embodiments, the buffer controller 125 (and/or the external buffer 130) may be omitted and provided external to the Emory controller 120.

The memory manager 126 may access the nonvolatile memory device 110 under control of the processor 124. The memory manager 126 may communicate with the nonvolatile memory device 110 through the first signal lines SIGL1 and the second signal lines SIGL2 under control of the processor 124. For example, the memory manager 126 may access the nonvolatile memory device 110 through the first signal lines SIGL1 and the second signal lines SIGL2. The memory manager 126 may communicate with the nonvolatile memory device 110, based, e.g., on a protocol that is defined in compliance with the standard and/or is defined by a manufacturer and/or user.

The error correction code block 127 may perform error correction encoding on data to be provided to the nonvolatile memory device 110 by using an error correction code (ECC). The error correction code block 127 may perform error correction decoding on data received from the nonvolatile memory device 110 using the error correction code (ECC).

In some example embodiments, the storage device 100 may not include the external buffer 130 and the buffer controller 125. When the external buffer 130 and the buffer controller 125 are not included in the storage device 100, the above functions of the external buffer 130 and the buffer controller 125 may be performed by the internal buffer 123.

Figure 2:
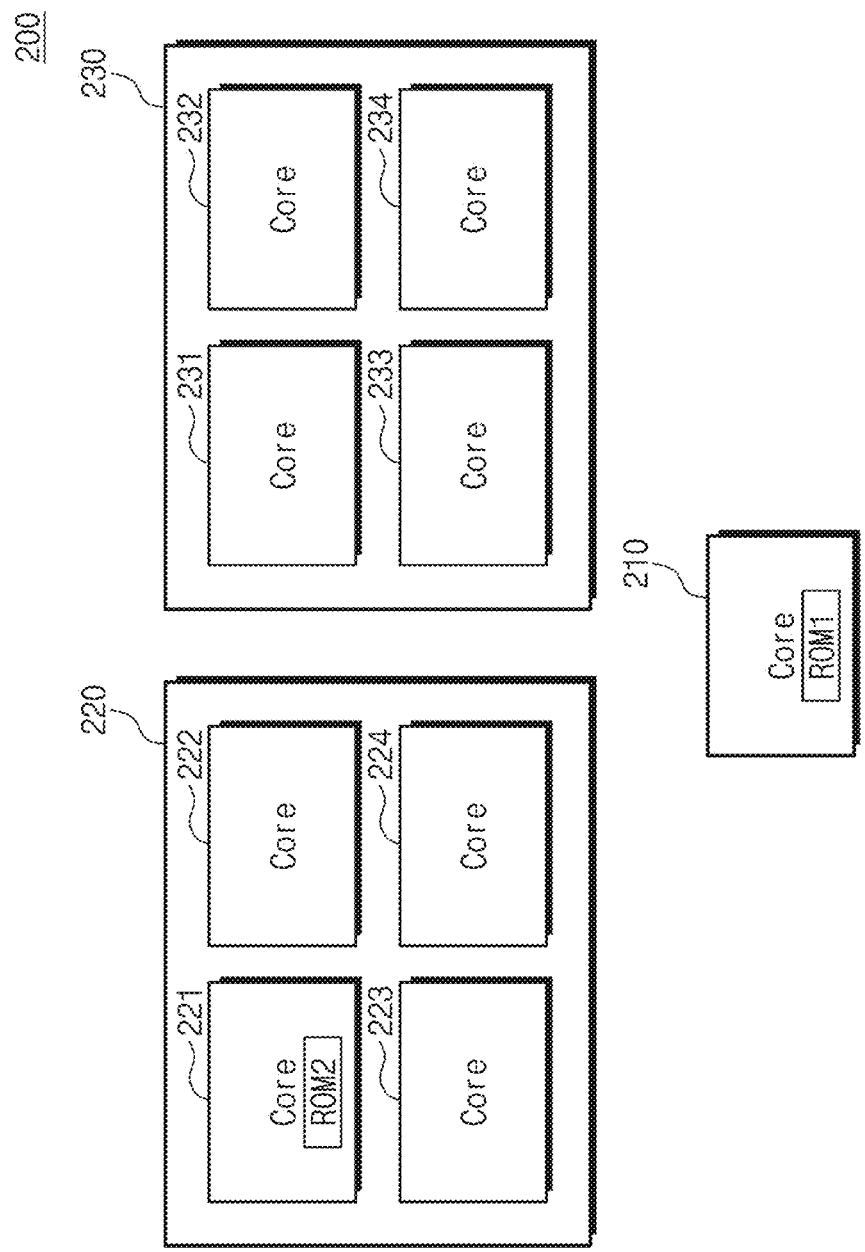
FIG. 2 illustrates an example of a processor.

FIG. 2 illustrates an example of a processor 200. For example, the processor 200 may correspond to the processor 124 of FIG. 1. Referring to FIGS. 1 and 2, the processor 200 may include a first core 210, a second core group 220, and a third core group 230.

The first core 210 may be a security core. The first core 210 may be implemented to perform tasks associated with the security of the data. The first core 210 may be implemented to have higher security than cores of the second core group 220 and the third core group 230. The first core 210 may include a first read only memory ROM1. The first read only memory ROM1 may be implemented with a root of trust (ROT). In the initialization of the storage device 100, the first read only memory ROM1 may be implemented to perform an initial security process such that there are executed internal security codes associated with the security of the storage device 100.

The second core group 220 may include a plurality of cores (e.g., first to fourth cores 221, 222, 223, and 224). The plurality of cores (e.g., first to fourth cores 221, 222, 223, and 224) of the second core group 220 may perform communication with the external host device through the host interface 122.

For example, the plurality of cores (e.g., first to fourth cores 221, 222, 223, and 224) of the second core group 220 may parse and/or process requests from the external host device so as to be transferred to the third core group 230. The plurality of cores (e.g., first to fourth cores 221, 222, 223, and 224) of the second core group 220 may manage the output of a response, data, and/or various messages to the external host device.

At least one of the plurality of cores (e.g., at least one of first to fourth cores 221, 222, 223, and 224) of the second core group 220, for example, the first core 221 may include a second read only memory ROM2. In the initialization of the storage device 100, the second read only memory ROM2 may be implemented to execute an internal code such that at least a part of the booting data BD stored in the second region 112 of the nonvolatile memory device 110 is loaded on the memory controller 120.

The third core group 230 may include a plurality of cores (e.g., first to fourth cores 231, 232, 233, and 234). The plurality of cores (e.g., first to fourth cores 231, 232, 233, and 234) of the third core group 230 may perform communication with the nonvolatile memory device 110 through the memory manager 126.

For example, the plurality of cores (e.g., first to fourth cores 231, 232, 233, and 234) of the third core group 230 may access the nonvolatile memory device 110, based on commands from the plurality of cores of the second core group 220 (e.g., first to fourth cores 221, 222, 223, and 224). The plurality of cores (e.g., first to fourth cores 231, 232, 233, and 234) of the third core group 230 may perform various operations for managing the nonvolatile memory device 110, for example, various background operations for the nonvolatile memory device 110 such as a garbage collection operation, a read reclaim operation, a wear-leveling management operation, and/or the like.

An example in which the first core 210 is implemented with one core, the second core group 220 includes four cores, and the third core group 230 includes four cores is illustrated. However, the number of cores designated to perform the security task, the number of cores of the second core group 220 designated to process communication with the external host device, and the number of cores of the third core group 230 designated to manage the nonvolatile memory device 110 are not limited thereto, and the number of cores designated to perform the security task, the number of cores of the second core group 220 designated to process communication with the external host device, and the number of cores of the third core group 230 designated to manage the nonvolatile memory device 110 may be smaller or larger than illustrated.

Figure 3:
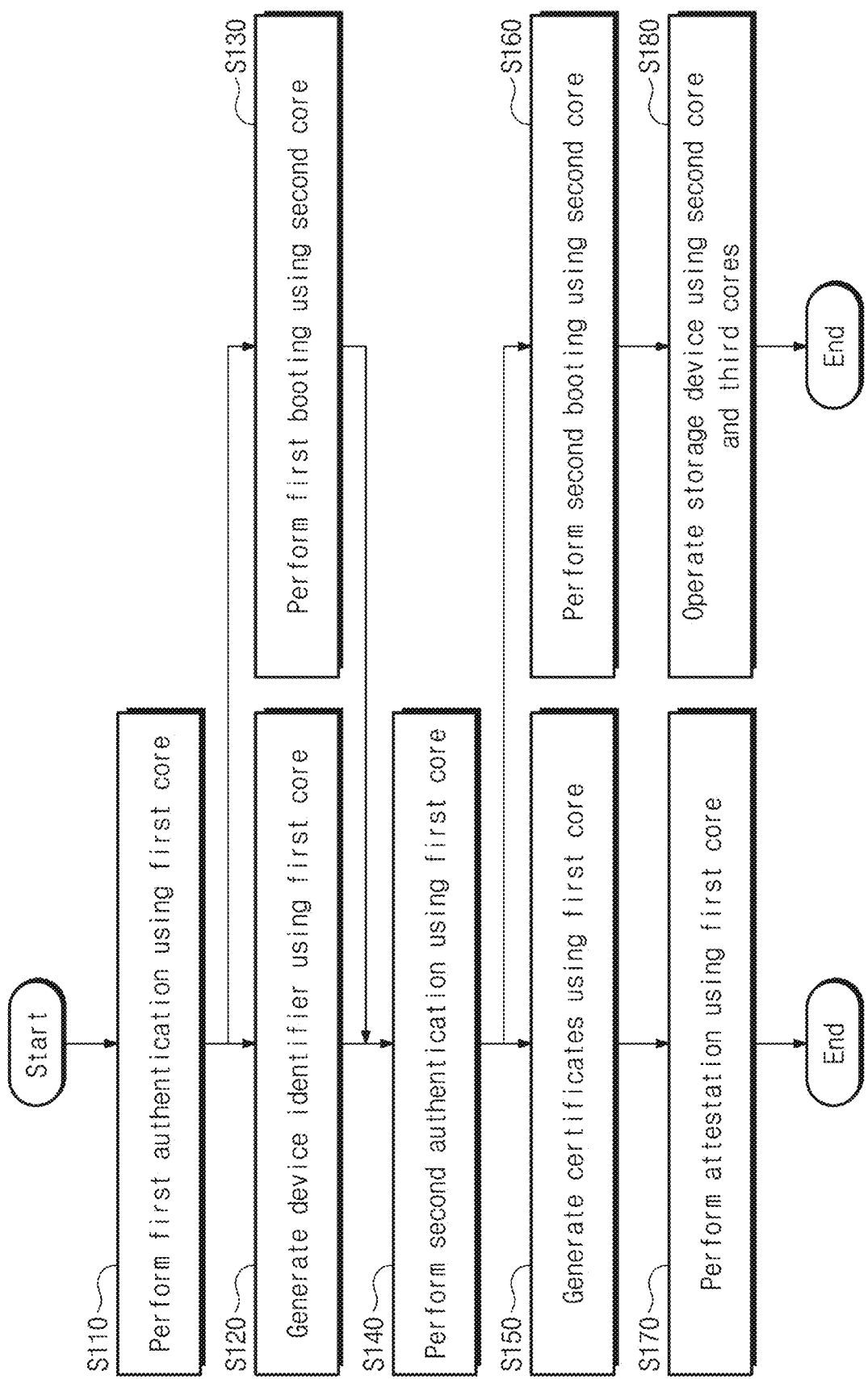
FIG. 3 illustrates an example of an operating method of a storage device.

FIG. 3 illustrates an example of an operating method of the storage device 100. In some example embodiments, an example of an initialization (or booting) process of the storage device 100 is illustrated in FIG. 3. The operating method may be executed, for example, by the processor 200 of FIG. 2. Referring to FIGS. 1, 2, and 3, in operation S110, the memory controller 120 of the storage device 100 may perform first authentication by using the first core 210. The first core 210 may be a security core. The first core 210 may perform the first authentication on at least a first part of the booting data BD stored in the second region 112 of the nonvolatile memory device 110.

When the first authentication fails, the booting data BD stored in the second region 112 of the nonvolatile memory device 110 may be considered as being contaminated or changed illegally (e.g., without permission). Accordingly, the memory controller 120 may stop the initialization (or booting) of the storage device 100. When the first authentication succeeds, operation S120 and operation S130 may be performed.

In operation S120, the memory controller 120 of the storage device 100 may generate a device identifier using the first core 210. For example, the first core 210 may generate the device identifier based on the first part of the booting data BD stored in the second region 112 of the nonvolatile memory device 110 and internal information.

In operation S130, the memory controller 120 of the storage device 100 may perform first booting using a second core. The second core may be the first core 221 of the second core group 220, which includes the second read only memory ROM2. The second core may perform the first booting by loading the first part of the booting data BD stored in the second region 112 of the nonvolatile memory device 110 on the memory controller 120.

In some example embodiments, operation S120 and operation S130 may be performed at least partially in parallel, independently, and/or simultaneously. Because the security process using the first core 210 and the first booting using the second core are performed at least partially in parallel, independently, and/or simultaneously, the booting speed may be improved while also improving the security based on the security process.

In operation S140, the memory controller 120 of the storage device 100 may perform second authentication by using the first core 210. For example, the first core 210 may perform the second authentication on at least a second part of the booting data BD stored in the second region 112 of the nonvolatile memory device 110.

When the second authentication fails, the booting data BD stored in the second region 112 of the nonvolatile memory device 110 may be considered as being contaminated and/or changed illegally (e.g., without permission). Accordingly, the memory controller 120 may stop the initialization (or booting) of the storage device 100. When the second authentication succeeds, operation S150 and operation S160 may be performed.

In operation S150, the memory controller 120 of the storage device 100 may generate certificates by using the first core 210. For example, the first core 210 may generate at least one certificate based on the device identifier. The first core 210 may generate another certificate based on the device identifier and at least a portion of the second part of the booting data BD stored in the second region 112 of the nonvolatile memory device 110.

In operation S160, the memory controller 120 of the storage device 100 may perform second booting by using the second core. The second core may be the first core 221 of the second core group 220, which includes the second read only memory ROM2. The second core may perform the second booting by loading the second part of the booting data BD stored in the second region 112 of the nonvolatile memory device 110 on the memory controller 120.

In some example embodiments, operation S150 and operation S160 may be performed at least partially in parallel, independently, and/or simultaneously. Because the security process using the first core 210 and the second booting using the second core are performed at least partially in parallel, independently, and/or simultaneously, the booting speed may be improved while also improving the security based on the security process.

In operation S170, the memory controller 120 of the storage device 100 may perform attestation by using the first core 210. For example, depending on a request of the external host device, the first core 210 may perform an attestation process of firmware codes that are executed by the plurality of cores of the second core group 220 (e.g., the first to fourth cores 221, 222, 223, and 224) and the plurality of the third core group 230 (e.g., the first to fourth cores 231, 232, 233, and 234). For example, the attestation process may be based on a device identifier composition engine (DICE).

In operation S180, the memory controller 120 of the storage device 100 may drive the storage device 100 by using the second cores and third cores. For example, the second cores and the third cores may respectively correspond to the first to fourth cores 221, 222, 223, and 224 of the second core group 220 and the first to fourth cores 231, 232, 233, and 234 of the third core group 230. The second and third cores may drive the storage device 100 by executing the firmware codes, respectively.

In some example embodiments, operation S170 and operation S180 may be performed at least partially in parallel, independently, and/or simultaneously. Because the security process using the first core 210 and the driving of the storage device 100 using the second core are performed at least partially in parallel, independently, and/or simultaneously, the operating speed of the storage device 100 may be improved together while also improving the security based on the security process.

Figure 4:
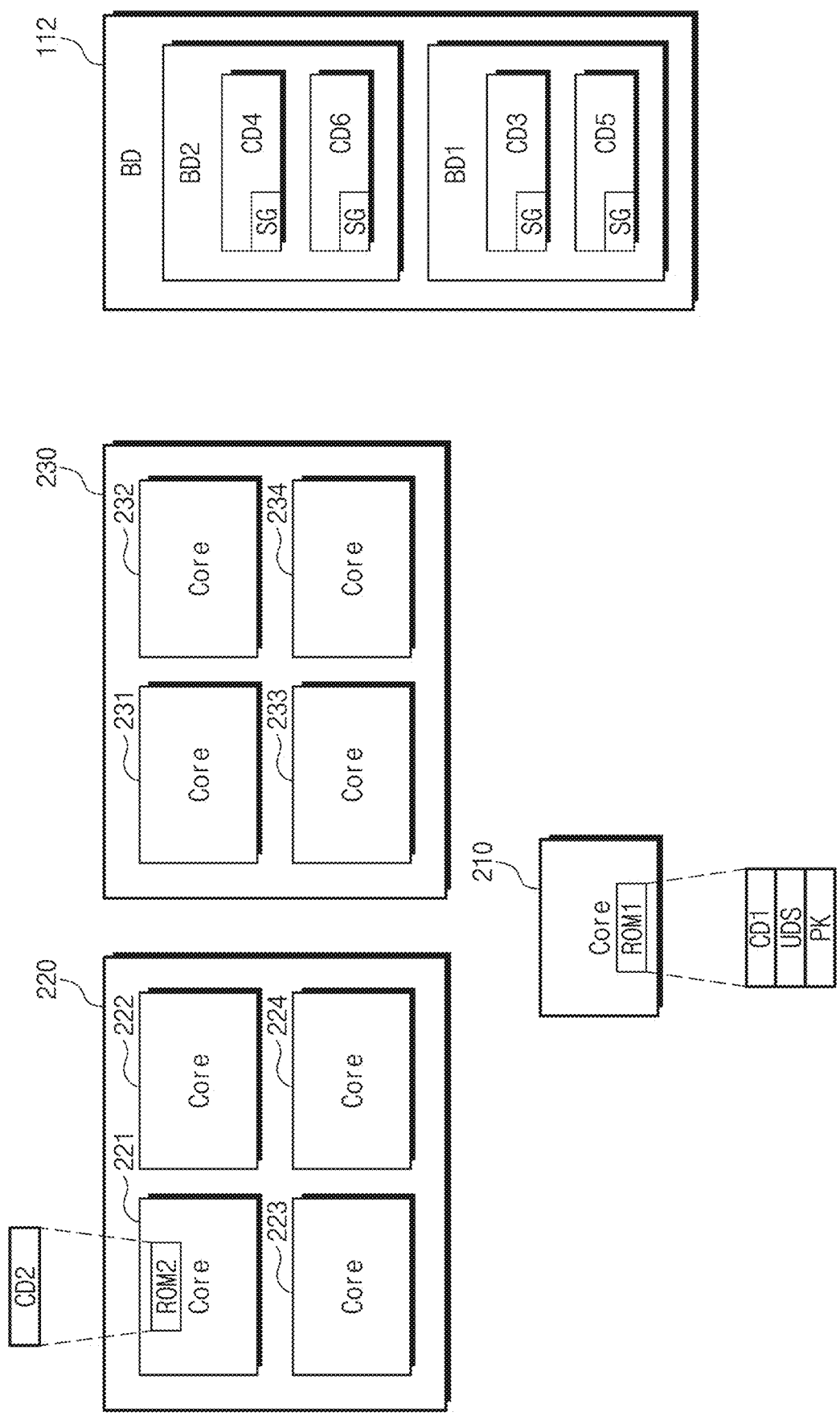
FIG. 4 illustrates an example of data stored in a storage device for initialization or booting of the storage device.

FIG. 4 illustrates an example of data stored in the storage device 100 for the initialization or booting of the storage device 100. Referring to FIGS. 1 and 4, the booting data BD stored in the second region 112 of the nonvolatile memory device 110 may include first booting data BD1 and second booting data BD2.

The first booting data BD1 may include a third code CD3 and a fifth code CD5. The third code CD3 and the fifth code CD5 may be security codes for the security process of the first core 210. The third code CD3 and the fifth code CD5 may respectively include signatures SG that are generated based on a common private key and/or different private keys.

The second booting data BD2 may include a fourth code CD4 and a sixth code CD6. The fourth code CD4 and the sixth code CD6 may be codes for the boot loading process of a core (e.g., the first core 221) of the second core group 220. The fourth code CD4 and the sixth code CD6 may respectively include signatures SG that are generated based on a common private key and/or different private keys.

The first read only memory ROM1 may include a first code CD1, a unique device secret (UDS) value, and a public key PK. The first code CD1 may be an internal security code for performing the security process. The UDS value may be a value that is uniquely designated to the storage device 100. The public key PK may be a public key that corresponds to a private key that is used to generate the signatures SG of the third code CD3 and the fifth code CD5 of the first booting data BD1.

The second read only memory ROM2 may include a second code CD2. The second code CD2 may be an internal code for performing the boot loading process.

FIGS. 5 to 11 illustrate an example of a process in which initialization or booting is performed in the storage device 100. Below, a process in which initialization or booting is performed in the storage device 100 will be described with reference to FIGS. 5 to 11.

Figure 5:
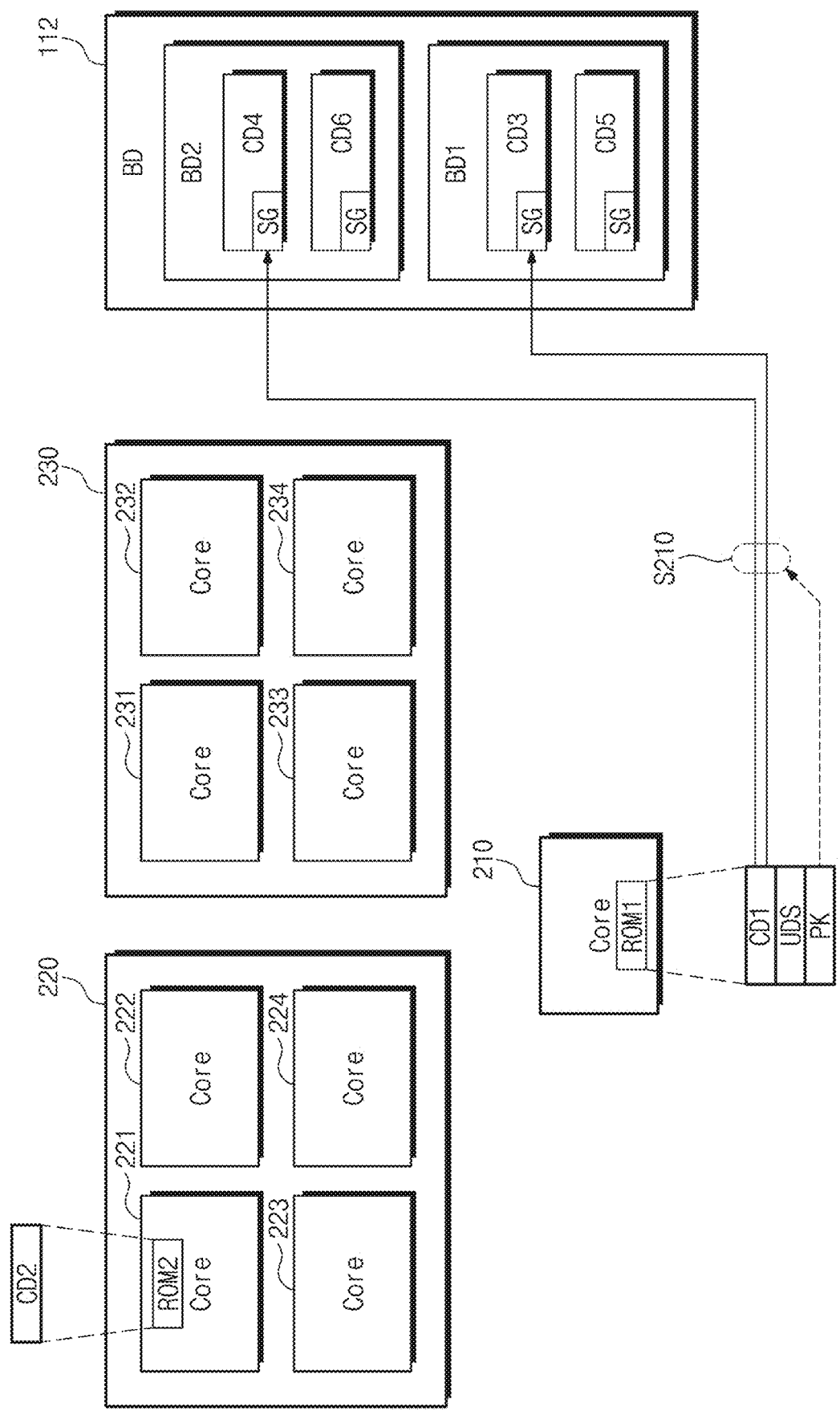
FIG. 5 illustrates an example in which first authentication is performed in initialization or booting of a storage device.

FIG. 5 shows an example in which first authentication is performed in the initialization or booting of the storage device 100 (refer to operation S110 of FIG. 3). Referring to FIGS. 1 and 5, in operation S210, the first read only memory ROM1 may execute the first code CD1 to perform first authentication on the third code CD3 and the fourth code CD4.

For example, the first code CD1 may be an internal security code. The first code CD1 may be, e.g., a device identifier composition engine (DICE) code. The first code CD1 may perform the first authentication by authenticating the signatures SG of the third code CD3 and the fourth code CD4 using the public key PK. For example, the public key PK may be a common public key and/or different public keys used to authenticate the third code CD3 and/or the fourth code CD4. When the first authentication fails, the storage device 100 may stop the initialization or booting process.

Figure 6:
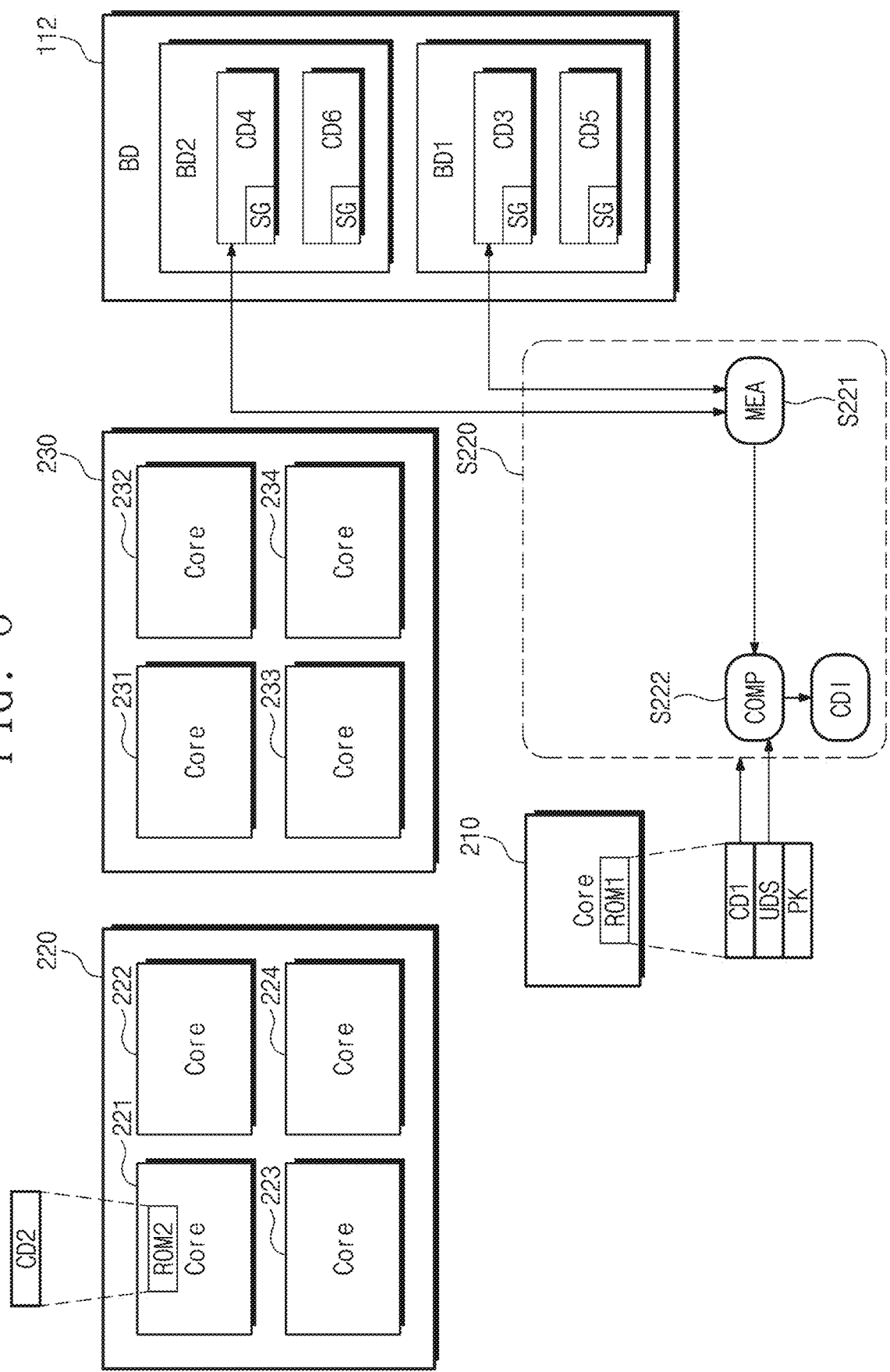
FIG. 6 illustrates an example of a process in which a device identifier is generated in initialization or booting of a storage device.

FIG. 6 shows an example of a process in which a compound device identifier CDI is generated in the initialization or booting of the storage device 100 (refer to operation S120 of FIG. 3). In some example embodiments, the generation of the compound device identifier CDI of FIG. 6 may be performed in response to the success of the first authentication of FIG. 5.

Referring to FIGS. 1 and 6, in operation S220, the first read only memory ROM1 may execute the first code CD1 and may generate the compound device identifier CDI based on internal information (e.g., the UDS value) and at least a first part (e.g., the third code CD3 and the fourth code CD4) of the booting data BD.

Operation S220 may include operation S221 and operation S222. In operation S221, the first core 221 may execute the first code CD1 and may perform measurement MEA on at least a first part of the booting data BD, for example, on the third code CD3 and the fourth code CD4. For example, the measurement MEA may be a goodness-of-fit type measurement and/or may include applying a hash function to the third code CD3 and the fourth code CD4.

For example, the first core 210 may read the third code CD3 and the fourth code CD4 of the booting data BD from the second region 112 of the nonvolatile memory device 110 and may apply the hash function to the third code CD3 and the fourth code CD4 thus read.

In operation S222, the first core 210 may generate the compound device identifier CDI by performing composition COMP on a result of the measurement MEA (e.g., a result of the hash function) and the UDS value. For example, the composition COMP may include an HMAC (keyed-Hash Message Authentication Code or Hash-based Message Authentication Code) operation.

The UDS value may be unique to the storage device 100 and may be a fixed value. Accordingly, in the case where the third code CD3 or the fourth code CD4 does not change, the compound device identifier CDI may always have the same value. In the case where the third code CD3 or the fourth code CD4 changes, the compound device identifier CDI may also change.

Figure 7:
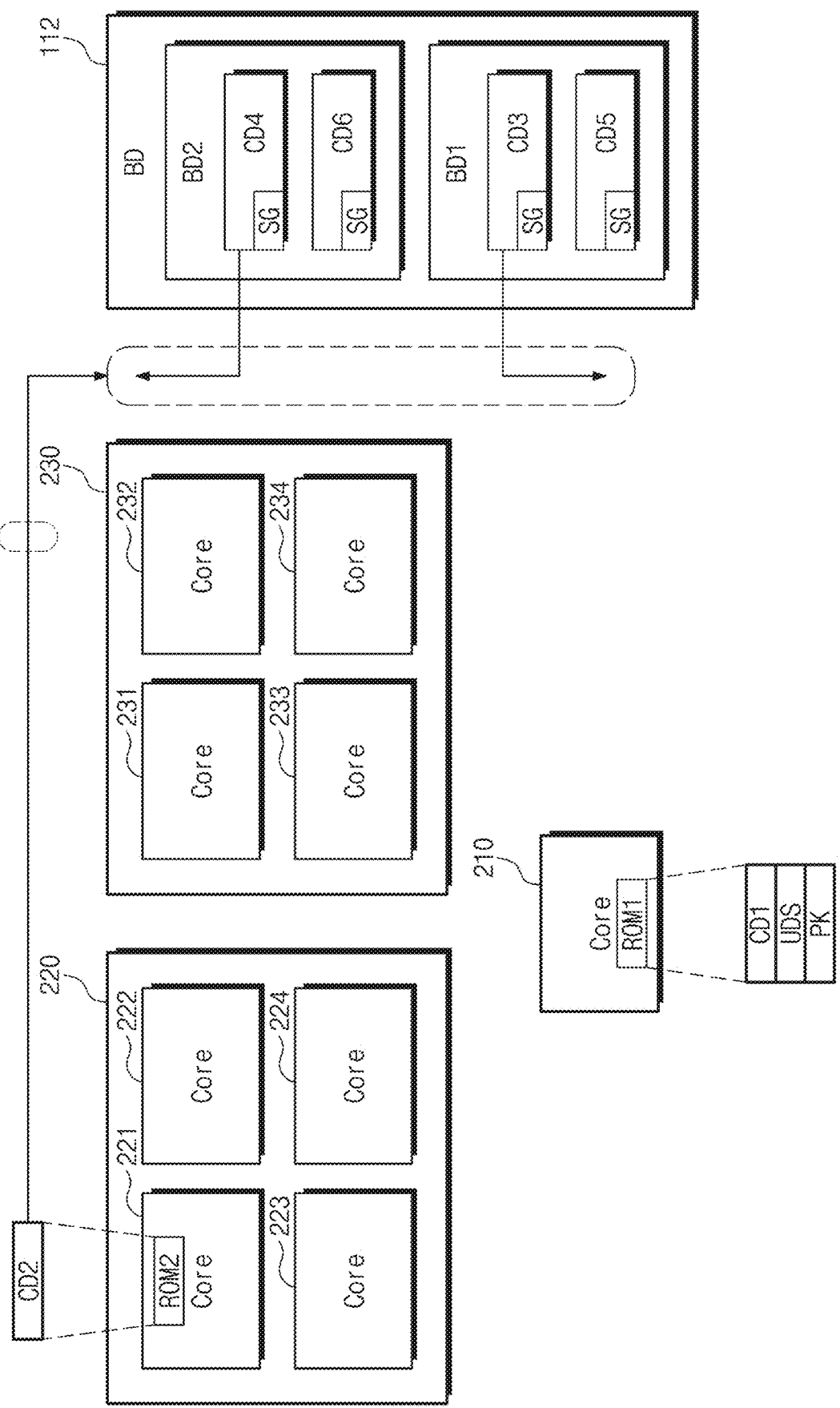
FIG. 7 illustrates an example of a process in which first booting is performed in initialization or booting of a storage device.

FIG. 7 shows an example of a process in which first booting is performed in the initialization or booting of the storage device 100 (refer to operation S130 of FIG. 3). In some example embodiments, the first booting of FIG. 7 may be performed in response to the success of the first authentication of FIG. 5. The first booting of FIG. 7 may be performed at least partially in parallel, independently, and/or simultaneously with the generation of the compound device identifier CDI of FIG. 6.

Referring to FIGS. 1 and 7, in operation S230, the second read only memory ROM2 may execute the second code CD2 and may load at least a first part of the booting data BD stored in the second region 112 of the nonvolatile memory device 110, for example, the third code CD3 and the fourth code CD4 on the memory controller 120.

For example, the third code CD3 may be a security code. The second read only memory ROM2 may execute the second code CD2 to load the third code CD3 on the first core 210. The first code CD1 may transfer the compound device identifier CDI and the public key(s) PK to the third code CD3 for driving the first core 210. The first code CD1 may hand over the authority to perform the security process of the initialization or booting to the third code CD3.

The fourth code CD4 may be a boot loader code. The second read only memory ROM2 may execute the second code CD2 to load the fourth code CD4 on the first core 221 of the second core group 220. The second code CD2 may hand over the authority to perform the boot loading process of the initialization or booting to the fourth code CD4.

Figure 8:
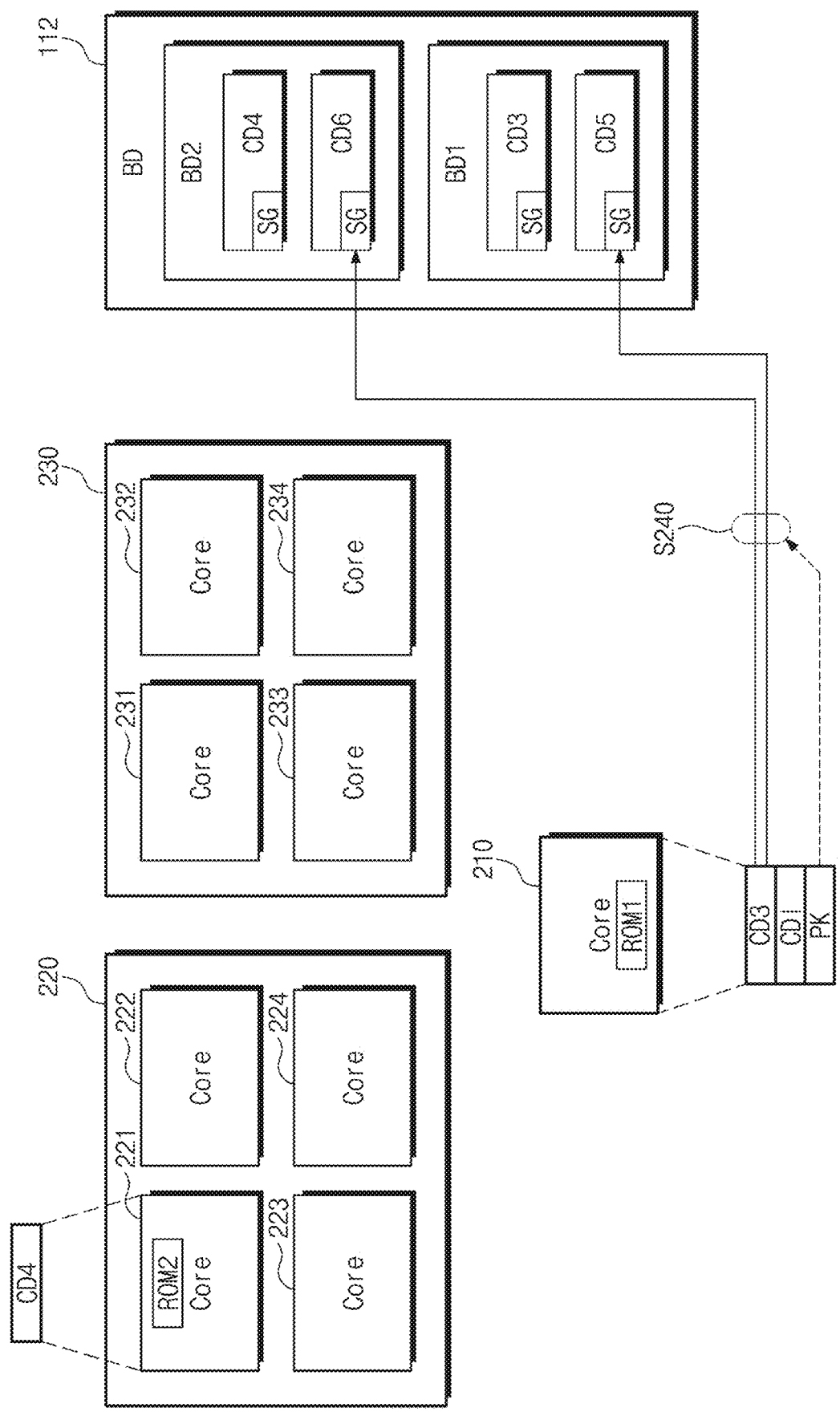
FIG. 8 illustrates an example in which second authentication is performed in initialization or booting of a storage device.

FIG. 8 shows an example in which second authentication is performed in the initialization or booting of the storage device 100 (refer to operation S140 of FIG. 3). In some example embodiments, the second authentication of FIG. 8 may be performed in response to the loading of the third code CD3 in the second booting of FIG. 7.

Referring to FIGS. 1 and 8, in operation S240, the first core 210 may execute the third code CD3 loaded from the second region 112 of the nonvolatile memory device 110 and may perform the second authentication on at least a second part of the booting data BD stored in the second region 112 of the nonvolatile memory device 110, for example, the fifth code CD5 and the sixth code CD6.

The third code CD3 may perform the second authentication by authenticating the signatures SG of the fifth code CD5 and the sixth code CD6 by using the public key PK. For example, the fifth code CD5 and the sixth code CD6 may be authenticated by using a common public key or different public keys. For example, the public key(s) used in the second authentication may be identical to and/or different from the public key(s) used in the first authentication. When the second authentication fails, the storage device 100 may stop the initialization or booting process.

Figure 9:
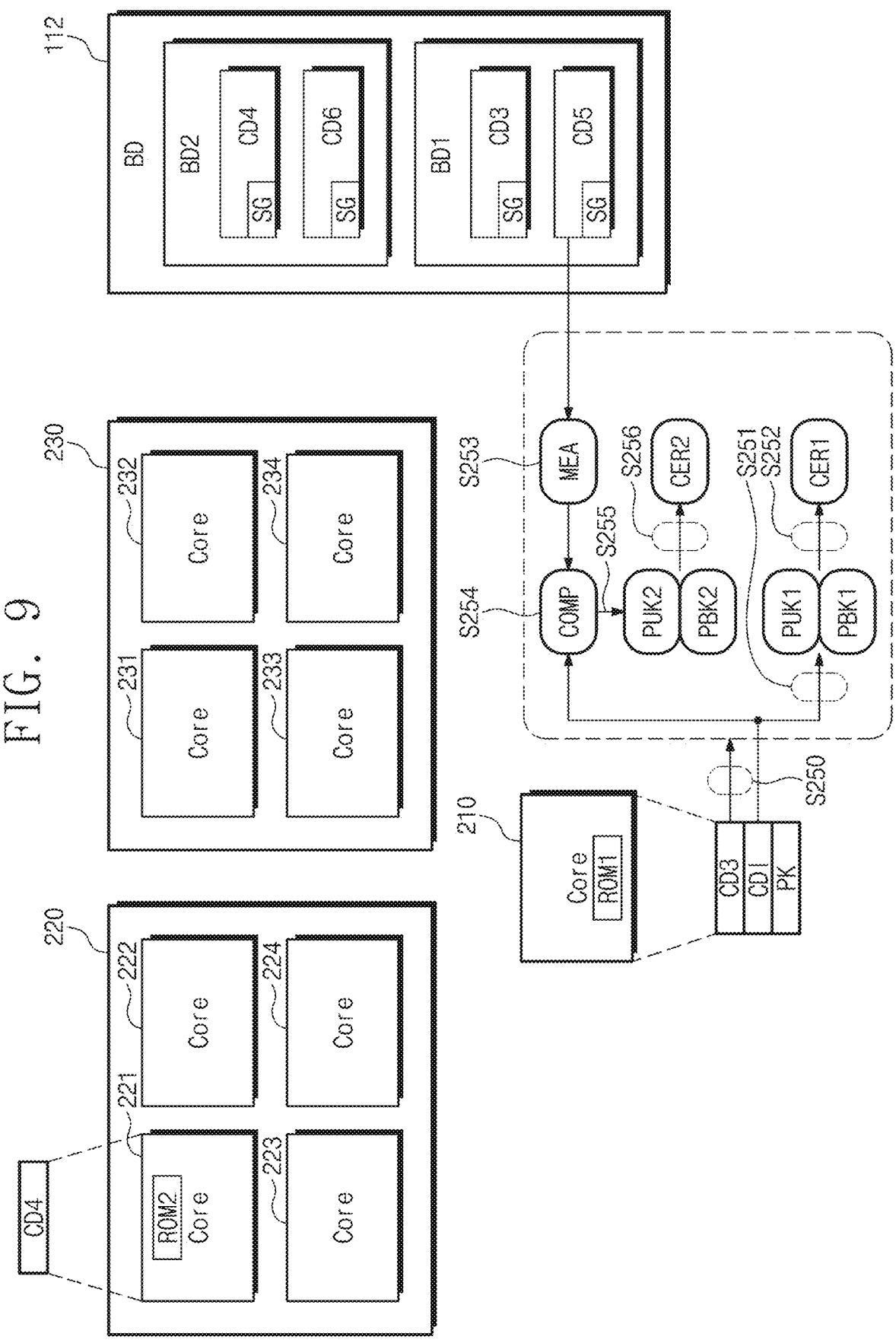
FIG. 9 illustrates an example of a process in which certificates are generated in initialization or booting of a storage device.

FIG. 9 shows an example of a process in which certificates are generated in the initialization or booting of the storage device 100 (refer to operation S150 of FIG. 3). In some example embodiments, the generation of the certificates of FIG. 9 may be performed in response to the success of the second authentication of FIG. 8.

Referring to FIGS. 1 and 9, in operation S250, the first core 210 may execute the third code CD3 to generate a first certificate CER1 and a second certificate CER2. Operation S250 may include operation S251, operation S252, operation S253, operation S534, and operation S255.

In operation S251, the first core 210 may execute the third code CD3 to generate a pair of keys, (e.g., a first public key PUK1 and a first private key PBK1) from the compound device identifier CDI. For example, the first core 210 may generate the pair of keys (e.g., the first public key PUK1 and the first private key PBK1) by applying an RSA (Rivest, Shamir, Adelman) and/or ECC (Elliptic Curve Cryptography) operation to the compound device identifier CDI.

In operation S252, the first core 210 may execute the third code CD3 to generate the first certificate CER1 from the first public key PUK1 and the first private key PBK1. For example, the first core 210 may generate the first certificate CER1 such that the first public key PUK1, information of the first public key PUK1, and a signature generated by the first private key PBK1 are included therein.

For example, the first public key PUK1 may be a device identifier public key associated with the DICE. The first private key PBK1 may be a device identifier private key associated with the DICE. The first certificate CER1 may be a device identifier certificate associated with the DICE.

In operation S253, the first core 221 may execute the third code CD3 and may perform the measurement MEA on at least a second part of the booting data BD, for example, on the fifth code CD5. For example, the measurement MEA may include applying a hash function to the fifth code CD5.

For example, the first core 210 may read the fifth code CD5 of the booting data BD from the second region 112 of the nonvolatile memory device 110 and may apply the hash function to the fifth code CD5 thus read.

In operation S254, the first core 210 may perform the composition COMP on a result of the measurement MEA (e.g., a result of the hash function) and the compound device identifier CDI. For example, the composition COMP may include sequentially listing at least a part or all of a device identifier and at least a part or all of the result of the measurement MEA. Alternatively, the composition COMP may include performing a logical operation (e.g., an XOR operation) on at least a part or all of a device identifier and at least a part or all of the result of the measurement MEA.

In operation S255, the first core 210 may execute the third code CD3 to generate a second pair of keys (e.g., a second public key PUK2 and a second private key PBK2 from a result of the composition COMP). For example, the first core 210 may generate the second pair of keys (e.g., the second public key PUK2 and the second private key PBK2) by applying the RSA (Rivest, Shamir, Adelman) and/or ECC (Elliptic Curve Cryptography) operation to the result of the composition COMP.

In operation S256, the first core 210 may execute the third code CD3 to generate the second certificate CER2 from the second public key PUK2 and the second private key PBK2. For example, the first core 210 may generate the second certificate CER2 such that the second public key PUK2, information of the second public key PUK2, and a signature generated by the second private key PBK2 are included therein.

For example, the second public key PUK2 may be an alias public key associated with the DICE. The second private key PBK2 may be an alias private key associated with the DICE. The second certificate CER2 may be an alias certificate associated with the DICE.

Figure 10:
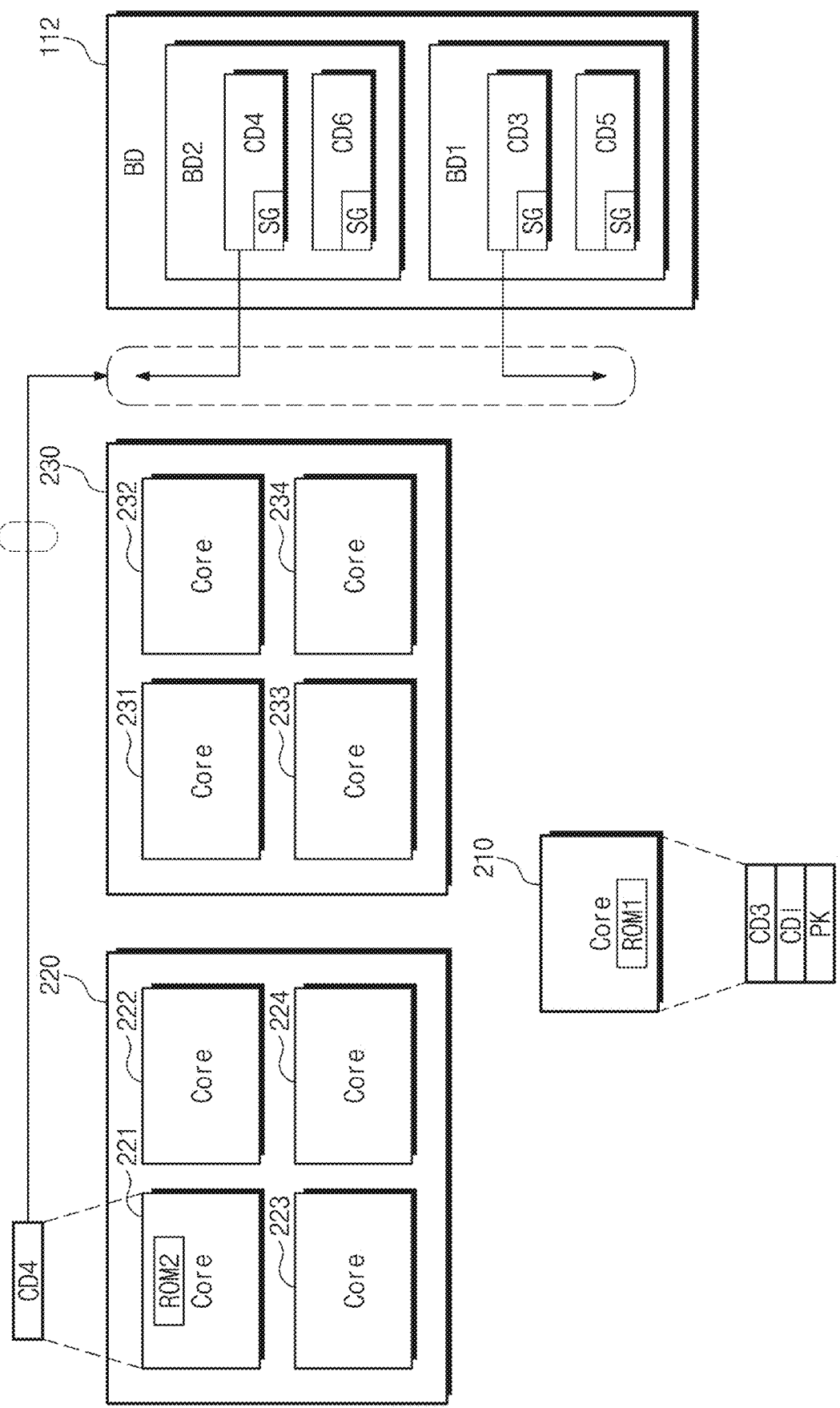
FIG. 10 illustrates an example of a process in which second booting is performed in initialization or booting of a storage device.

FIG. 10 shows an example of a process in which second booting is performed in the initialization or booting of the storage device 100 (refer to operation S160 of FIG. 3). In some example embodiments, the second booting of FIG. 10 may be performed in response to the success of the second authentication of FIG. 8. The second booting of FIG. 10 may be performed at least partially in parallel, independently, and/or simultaneously with the generation of the first certificate CER1 and the second certificate CER2 of FIG. 9.

Figure 11:
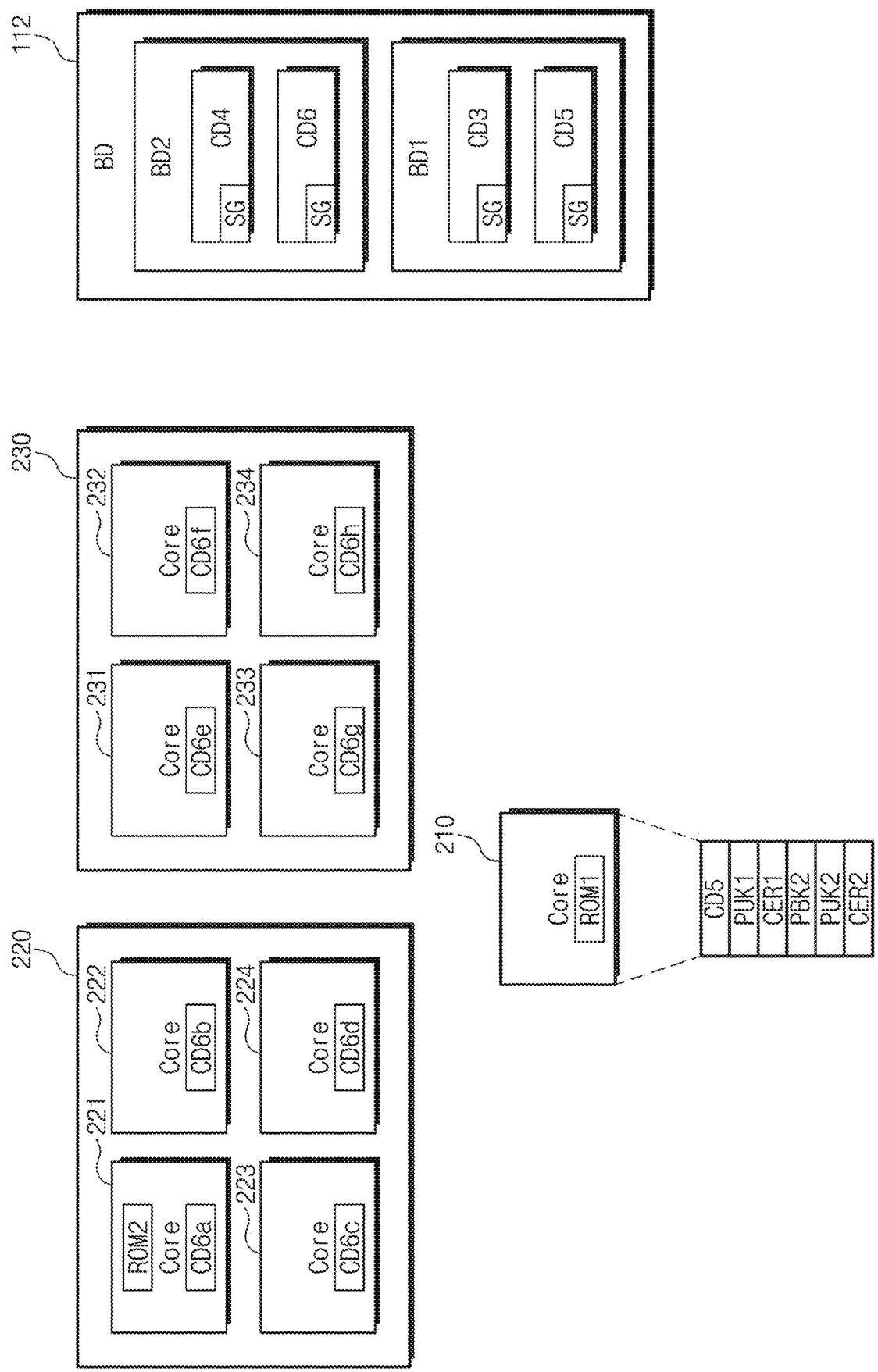
FIG. 11 illustrates an example of completed initialization or booting in a storage device.

FIG. 11 illustrates an example of a completed initialization or booting in the storage device 100. Referring to FIGS. 1, 10, and 11, in operation S260, the first core 221 of the second core group 220 may execute the fourth code CD4 and may load at least a second part of the booting data BD stored in the second region 112 of the nonvolatile memory device 110, for example, the fifth code CD5 and the sixth code CD6 on the memory controller 120.

For example, the fifth code CD5 may be a security code. The first core 221 of the second core group 220 may execute the fourth code CD4 to load the fifth code CD5 on the first core 210. The third code CD3 may transfer the first public key PUK1 and the first certificate CER1 (or the first certificate CER1 including the first public key PUK1) to the fifth code CD5.

The third code CD3 may transfer the second public key PUK2 and the second certificate CER2 (and/or the second certificate CER2 including the second public key PUK2) to the fifth code CD5. The third code CD3 may transfer the second private key PBK2 to the fifth code CD5. The third code CD3 may hand over the authority to perform the security process of the initialization or booting to the fifth code CD5.

The sixth code CD6 may be firmware codes. The first core 221 of the second core group 220 may execute the fourth code CD4 and may load firmware codes (e.g., CD6a, CD6b, CD6c, and CD6d) corresponding to the second core group 220 (e.g., the first to fourth cores 221, 222, 223, and 224) from among the firmware codes of the sixth code CD6 onto the plurality of cores of the second core group 220 (e.g., the first to fourth cores 221, 222, 223, and 224).

A core (e.g., the first core 221) of the second core group 220 may execute the fourth code CD4 and may load firmware codes (e.g., CD6e, CD6f, CD6g, and CD6h) corresponding to the third core group 230 (e.g., the first to fourth cores 231, 232, 233, and 234) from among the firmware codes of the sixth code CD6 onto the plurality of cores of the third core group 230 (e.g., the first to fourth cores 231, 232, 233, and 234).

The fourth code CD4 may hand over the authority to operate the storage device 100 to the firmware codes (e.g., CD6a, CD6b, CD6c, and CD6d) loaded on the second core group 220 and the firmware codes (e.g., CD6e, CD6f, CD6g, and CD6h) loaded on the third core group 230.

The second core group 220 (e.g., the first to fourth cores 221, 222, 223, and 224) may execute the loaded firmware codes (e.g., CD6a, CD6b, CD6c, and CD6d) to drive the storage device 100. For example, the first to fourth cores 221, 222, 223, and 224 of the second core group 220 may perform communication with the external host device and may transfer requests from the external host device to the first to fourth cores 231, 232, 233, and 234 of the third core group 230.

The third core group 230 (e.g., the first to fourth cores 231, 232, 233, and 234) may execute the loaded firmware codes (e.g., CD6e, CD6f, CD6g, and CD6h) to drive the storage device 100. For example, depending on requests from the second core group 220, the first to fourth cores 231, 232, 233, and 234 of the third core group 230 may access the nonvolatile memory device 110 and may manage a background operation(s). The third core group 230 (e.g., the first to fourth cores 231, 232, 233, and 234) may provide the second core group 220 with data or messages to be transferred to the external host device.

Figure 12:
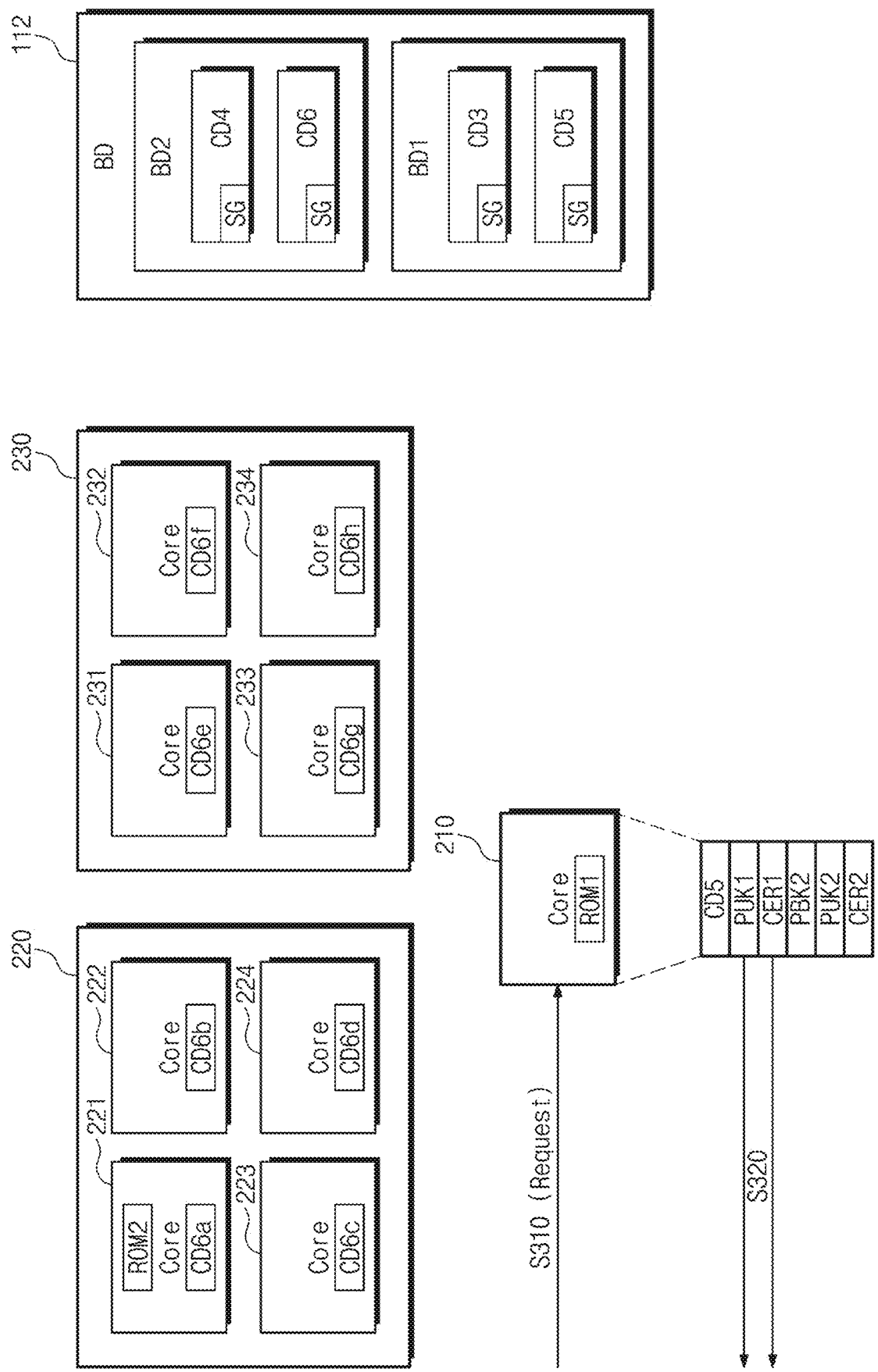
FIG. 12 shows a first phase of attestation.
Figure 13:
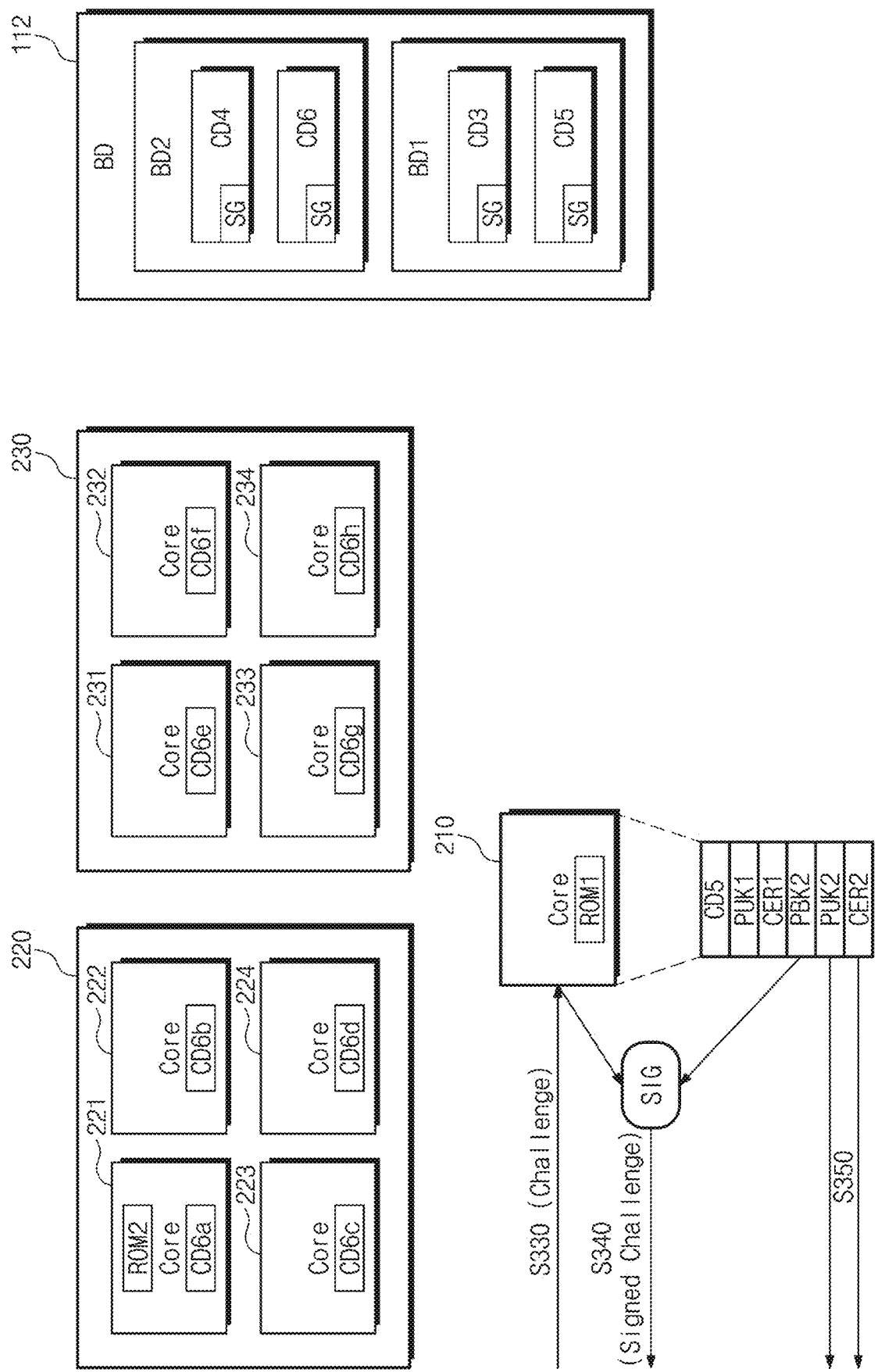
FIG. 13 shows a second phase of attestation.
Figure 14:
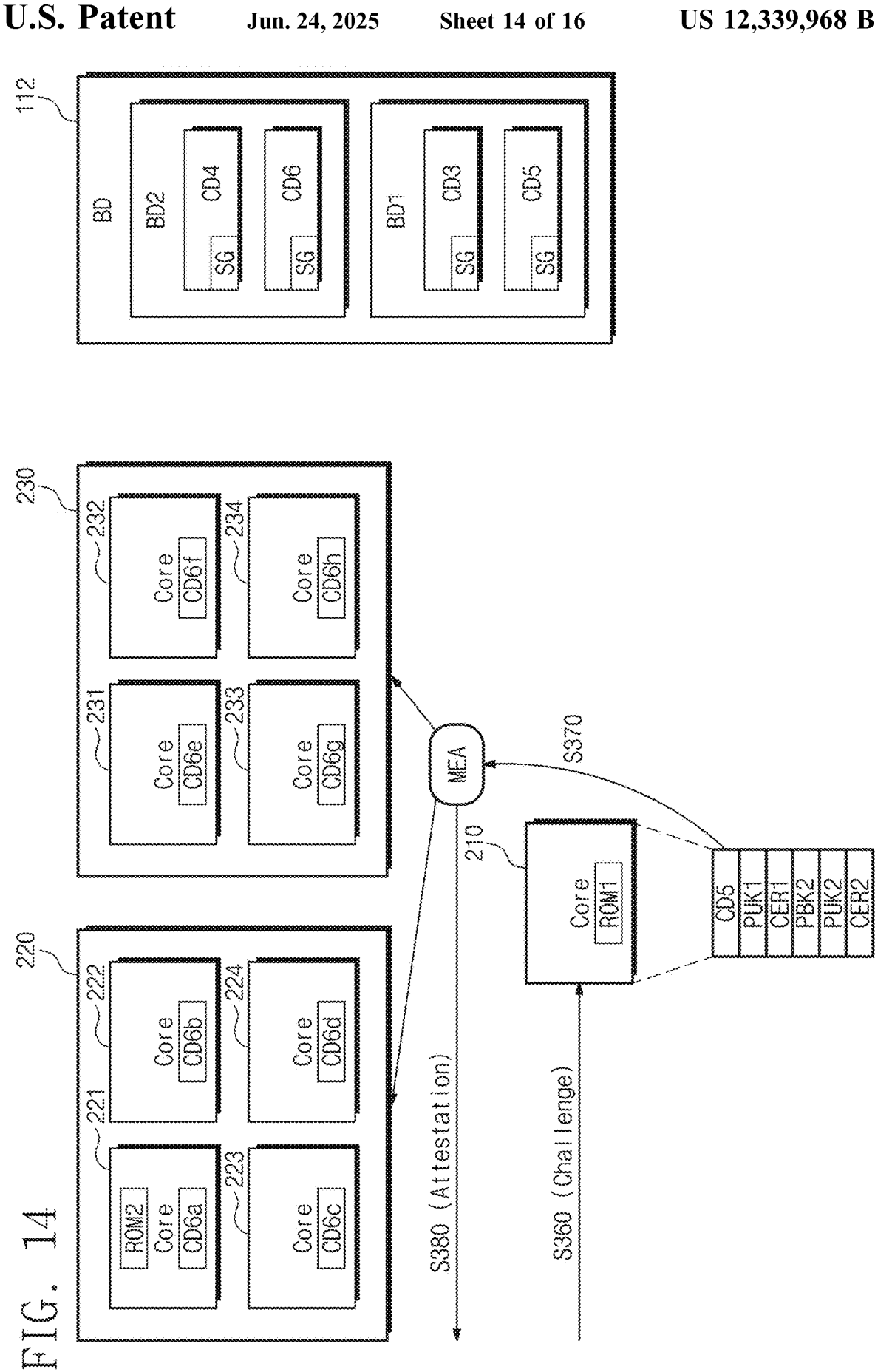
FIG. 14 shows a third phase of attestation.

FIGS. 12, 13, and 14 illustrate an example of a process in which the storage device 100 performs attestation. FIG. 12 shows a first phase of the attestation. Referring to FIGS. 1 and 12, in operation S310, the memory controller 120 of the storage device 100 may receive a request from the external host device. For example, the first core 210 may receive the request. For example, the request may be a request for certificate.

In response to the request, in operation S320, the first core 210 may execute the fifth code CD5 (e.g., security firmware) such that the first public key PUK1 and the first certificate CER1 or the first certificate CER1 including the first public key PUK1 is provided to the external host device. The external host device may authenticate a signature of the first certificate CER1 by using the first public key PUK1.

FIG. 13 shows a second phase of the attestation. In some example embodiments, the second phase of the attestation may be performed in response to that the signature is successfully authenticated in the first phase. When the authentication of the signature fails in the first phase, the attestation process may be interrupted. The external host device may determine that the storage device 100 is contaminated or attacked.

Referring to FIGS. 1 and 13, in operation S330, the external host device may transmit a challenge to the storage device 100. The challenge may include a random number. The first core 210 of the memory controller 120 of the storage device 100 may receive the challenge.

In operation S340, the first core 210 may perform a signature SIG on the challenge by using the second private key PBK2. The first core 210 may provide the signed challenge to the external host device. Alternatively, in operation S350, the first core 210 may provide the second public key PUK2 and the second certificate CER2 or the second certificate CER2 including the second public key PUK2 to the external host device. The external host device may authenticate the signed challenge by using the second public key PUK2.

FIG. 14 shows a third phase of the attestation. In some example embodiments, the third phase of the attestation may be performed in response to that the signature is successfully authenticated in the second phase. When the authentication of the signature fails in the second phase, the attestation process may be interrupted. The external host device may determine that the storage device 100 is contaminated or attacked.

Referring to FIGS. 1 and 14, in operation S360, the external host device may again transmit the challenge to the storage device 100. The first core 210 of the memory controller 120 of the storage device 100 may receive the challenge.

In operation S370, the first core 210 may execute the fifth code CD5 and may perform the measurement MEA on the firmware codes (e.g., CD6a, CD6b, CD6c, and CD6d) loaded on the second core group 220 (e.g., the first to fourth cores 221, 222, 223, and 224) and/or the firmware codes (e.g., CD6e, CD6f, CD6g, and CD6h) loaded on the third core group 230 (e.g., the first to fourth cores 231, 232, 233, and 234).

For example, the first core 210 may apply the hash function to the firmware codes CD6a, CD6b, CD6c, and CD6d loaded on the first to fourth cores 221, 222, 223, and 224 of the second core group 220 and the firmware codes CD6e, CD6f, CD6g, and CD6h loaded on the first to fourth cores 231, 232, 233, and 234 of the third core group 230.

In operation S370, the first core 210 may perform attestation by providing a result of the measurement MEA (e.g., a result of the hash function to the external host device). For example, the first core 210 may perform a signature on the result of the measurement MEA using the second private key PBK2. The first core 210 may provide the signed result to the external host device. The external host device may authenticate the signature by using the second public key PUK2 and may test the result of the measurement MEA.

In some example embodiments, the third phase of the attestation may be performed following the second phase without receiving the challenge.

Figure 15:
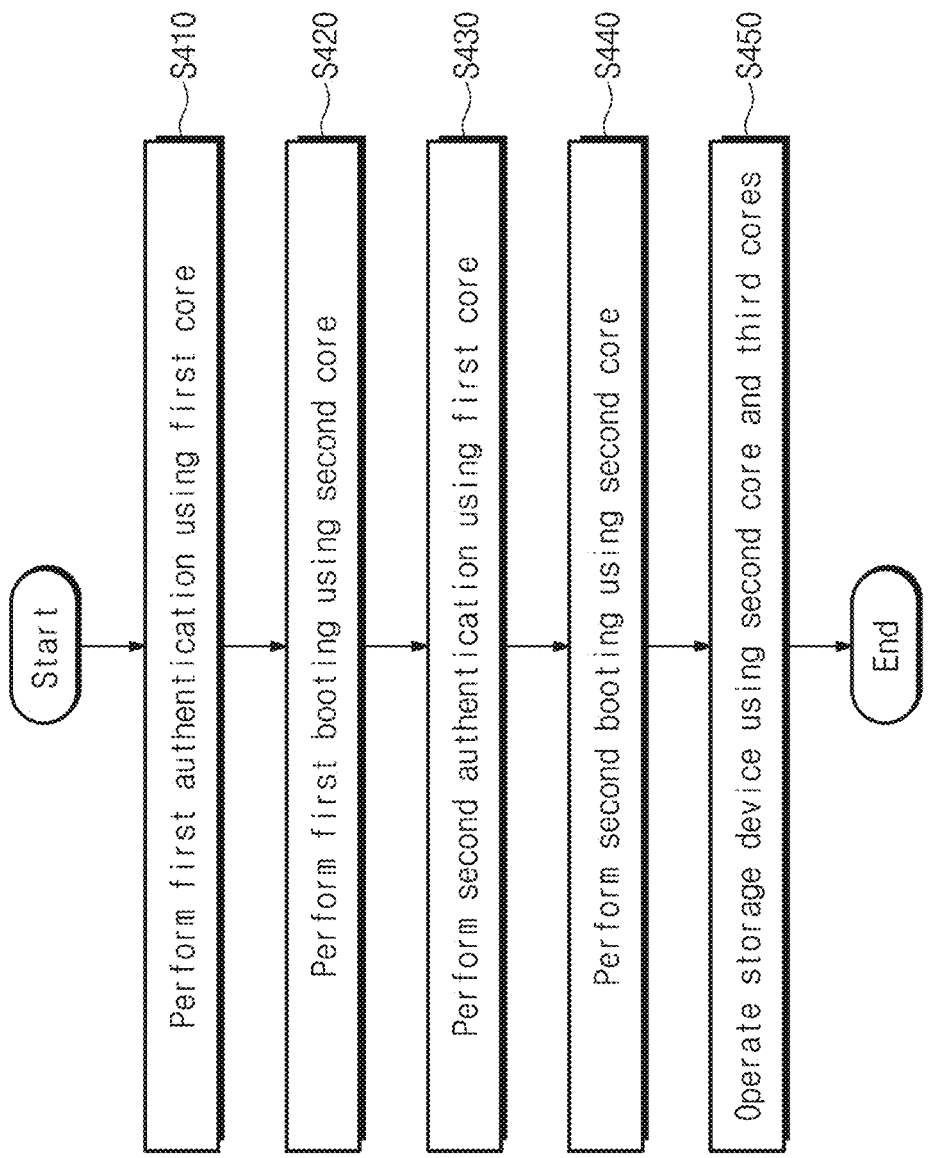
FIG. 15 illustrates another example of an operating method of a storage device.

FIG. 15 illustrates another example of an operating method of the storage device 100. In some example embodiments, another example of the initialization (or booting) process of the storage device 100 is illustrated in FIG. 15. The storage device 100 may operate depending on the operating method of FIG. 3 in a first mode of operation and may operate depending on the operating method of FIG. 15 in a second mode of operation. The operating method of FIG. 3 may be associated with the DICE-supported initialization (or booting), and the operating method of FIG. 15 may be associated with a default initialization (or booting).

Referring to FIGS. 1, 2, and 15, in operation S410, the memory controller 120 of the storage device 100 may perform first authentication by using the first core 210. Operation S410 may be performed to be the same as operation S110 of FIG. 3.

In operation S420, the memory controller 120 of the storage device 100 may perform first booting by using a second core. Operation S420 may be performed to be the same as operation S130 of FIG. 3.

In operation S430, the memory controller 120 of the storage device 100 may perform second authentication by using the first core 210. Operation S430 may be performed to be the same as operation S140 of FIG. 3.

In operation S440, the memory controller 120 of the storage device 100 may perform second booting by using the second core. Operation S440 may be performed to be the same as operation S160 of FIG. 3.

In operation S450, the memory controller 120 of the storage device 100 may drive the storage device 100 by using the second cores and third cores. Operation S450 may be performed to be the same as operation S180 of FIG. 3.

In some example embodiments, the first core 210 may not perform any other additional security process, such as measurement and authentication, other than authenticating a signature of booting data.

Figure 16:
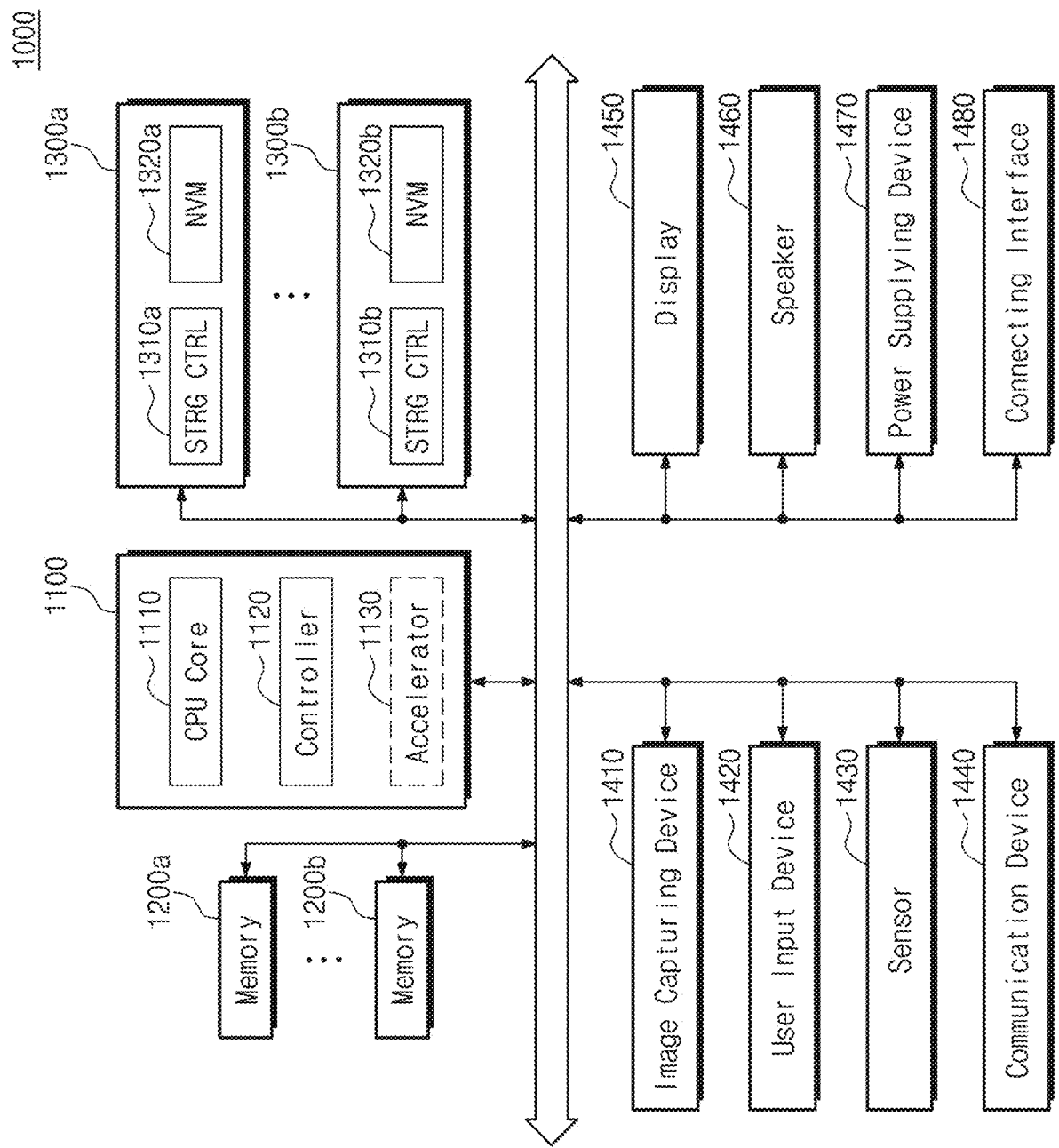
FIG. 16 is a diagram illustrating a system according to an embodiment of the present disclosure.

FIG. 16 is a diagram of a system 1000 to which a storage device is applied, according to some example embodiments. The system 1000 of FIG. 16 may be a mobile system, such as a portable communication terminal (e.g., a mobile phone), a smartphone, a tablet personal computer (PC), a wearable device, a healthcare device, an Internet of things (IOT) device, and/or the like. However, the system 1000 of FIG. 16 is not necessarily limited to the mobile system and may be a PC, a laptop computer, a server, a media player, an automotive device (e.g., a navigation device), and/or the like.

Referring to FIG. 16, the system 1000 may include a main processor 1100, memories (e.g., 1200a and 1200b), and storage devices (e.g., 1300a and 1300b). In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, more specifically, operations of other components included in the system 1000. The main processor 1100 may be implemented as a general-purpose processor, a dedicated processor, an application processor, and/or the like.

The main processor 1100 may include at least one CPU core 1110 and further include a controller 1120 configured to control the memories 1200a and 1200b and/or the storage devices 1300a and 1300b. In some embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU), a data processing unit (DPU), and/or the like; and be implemented as a chip that is physically separate from the other components of the main processor 1100.

The memories 1200a and 1200b may be used as main memory devices of the system 1000. Each of the memories 1200a and 1200b may include a volatile memory, such as static random access memory (SRAM) and/or dynamic RAM (DRAM), and/or each of the memories 1200a and 1200b may include non-volatile memory, such as a flash memory, phase-change RAM (PRAM) and/or resistive RAM (RRAM). The memories 1200a and 1200b may be implemented in the same package as the main processor 1100.

The storage devices 1300a and 1300b may serve as non-volatile storage devices configured to store data regardless of whether power is supplied thereto, and have larger storage capacity than the memories 1200a and 1200b. The storage devices 1300a and 1300b may respectively include storage controllers (STRG CTRL) 1310a and 1310b and NVM (Non-Volatile Memory)s 1320a and 1320b configured to store data via the control of the storage controllers 1310a and 1310*b*. Although the NVMs 1320*a* and 1320*b* may include flash memories having a two-dimensional (2D) structure or a three-dimensional (3D) V-NAND structure, the NVMs 1320*a* and 1320*b* may include other types of NVMs, such as PRAM and/or RRAM.

The storage devices 1300*a* and 1300*b* may be physically separated from the main processor 1100 and included in the system 1000 or implemented in the same package as the main processor 1100. In addition, the storage devices 1300*a* and 1300*b* may have types of solid-state devices (SSDs) or memory cards and be removably combined with other components of the system 100 through an interface, such as the connecting interface 1480 that will be described below. The storage devices 1300*a* and 1300*b* may be devices to which a standard protocol, such as a universal flash storage (UFS), an embedded multi-media card (eMMC), or a nonvolatile memory express (NVMe), is applied, without being limited thereto.

The image capturing device 1410 may capture still images or moving images. The image capturing device 1410 may include, e.g., a camera, a camcorder, and/or a webcam.

The user input device 1420 may receive various types of data input by a user of the system 1000 and include, e.g., a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include, e.g., a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include, e.g., an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery (not shown) embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and/or a compact flash (CF) card interface.

Though an example system 1000 is illustrated as including divisible components, the example embodiments are not limited thereto. For example, some of the illustrated blocks may be integrated (e.g., the user input device 1420 and the display 1450 may be integrated into a touch screen) and/or the system 1000 may include more or fewer functional blocks than is illustrated. In some example embodiments, the storage device 100 described with reference to FIGS. 1 to 15 may be implemented with the storage device 1300*a*/1300*b*.

In the above embodiments, components according to the present disclosure are described by using the terms "first", "second", "third", etc. However, the terms "first", "second", "third", etc. may be used to distinguish components from each other and do not limit the present disclosure. For example, the terms "first", "second", "third", etc. do not involve an order or a numerical meaning of any form.

In the above embodiments, components according to embodiments of the present disclosure are referenced using functional blocks. Except when indicated otherwise, the functional blocks may be implemented with processing circuitry such hardware, software, or the combination of hardware and software. For example, the processing circuitry may be included in and/or implemented as (and/or in) various hardware devices, such as an integrated circuit, an application specific IC (ASIC), a field programmable gate array (FPGA), and a complex programmable logic device (CPLD), firmware driven in hardware devices, software such as an application, and/or a combination of a hardware device and software. Also, the blocks may include circuits implemented with semiconductor elements in an integrated circuit, and/or circuits enrolled as an intellectual property (IP).

According to the present disclosure, a first core of a memory controller of a storage device performs authentication, measurement, and attestation, and a second core performs loading of booting data. Accordingly, a storage device increasing a booting speed and supporting improved security and an operating method of the storage device are provided.

While the present disclosure has been described with reference to some example embodiments thereof, it will be apparent to those of ordinary skill in the art that various changes and modifications may be made thereto without departing from the spirit and scope of the present disclosure as set forth in the following claims.

What is claimed is:

1. A storage device comprising:
   a nonvolatile memory device configured to store booting data and user data; and
   a memory controller including a first core, a second core, and one or more third cores, the one or more third cores configured to access the nonvolatile memory device based on commands from a second core group including the second core, the memory controller configured such that
   in an initialization operation, the first core is configured to perform a first authentication on a first part of the booting data,
   in response to the first authentication succeeding, the first core is configured to generate a device identifier, and the second core is configured to load the first part of the booting data and perform a first booting,
   the first core is configured to perform second authentication on a second part of the booting data, and
   in response to the second authentication succeeding, the first core is configured to generate a first certificate and a second certificate, and the second core is configured to load the second part of the booting data and to perform a second booting.

2. The storage device of claim 1, wherein the memory controller is configured such that the generating of the device identifier by the first core and the first booting by the second core are performed simultaneously.

3. The storage device of claim 1, wherein the first part of the booting data includes a first security code and a boot loader code.

4. The storage device of claim 3, wherein the first core is configured to execute an internal security code to generate the device identifier and to execute the first security code to perform the second authentication.

5. The storage device of claim 4, wherein the first core is configured to generate the device identifier based on the first part of the booting data.

6. The storage device of claim 3, wherein the second core is configured to load the first security code and the boot loader code, from the nonvolatile memory device, onto the first core and the second core, respectively.

7. The storage device of claim 3, wherein the second core is configured to execute the boot loader code to load the second part of the booting data from the nonvolatile memory device.

8. The storage device of claim 3, wherein the second part of the booting data includes a second security code and firmware codes.

9. The storage device of claim 8, wherein the first core is configured to execute the first security code to generate a first pair of keys from the device identifier, and to generate the first certificate from the first pair of keys.

10. The storage device of claim 8, wherein the first core is configured to execute the first security code to generate a second pair of keys from the device identifier and the second security code, and to generate the second certificate from the second pair of keys.

11. The storage device of claim 8, wherein each of the second core and the one or more third cores is configured to execute a corresponding firmware code of the firmware codes.

12. The storage device of claim 11, wherein the first core is configured to execute the second security code to perform attestation on the firmware codes respectively loaded onto the second core and the one or more third cores in response to a request of an external host device.

13. The storage device of claim 12, wherein the memory controller is configured such that the executing of the respective firmware codes by the second core and the one or more third cores and the attestation by the first core are performed simultaneously.

14. The storage device of claim 1, wherein the memory controller is configured such that the generating of the first certificate and the second certificate by the first core and the second booting by the second core are performed simultaneously.

15. An operating method of a storage device which includes a nonvolatile memory device and a memory controller configured to control the nonvolatile memory device and including a plurality of cores, the method comprising:
    authenticating, at a first core of the plurality of cores, booting data stored in the nonvolatile memory device;
    in response to the authentication succeeding, generating, at the first core of the plurality of cores, a first certificate and a second certificate by measuring at least a part of the booting data stored in the nonvolatile memory device; and
    loading, at a second core of the plurality of cores, the booting data stored in the nonvolatile memory device, wherein the authenticating of the booting data includes both
        authenticating a first security code and a boot loader code of the booting data, and
        authenticating a second security code and firmware codes of the booting data.

16. The method of claim 15, wherein the generating of the first certificate and the second certificate includes:
    measuring the first security code and the boot loader code and generating a device identifier based on a result of the measurement;
    generating the first certificate from the device identifier based on the first security code; and
    measuring the second security code and generating the second certificate from the device identifier and a measurement result of the second security code based on the second security code.

17. The method of claim 15, wherein the loading of the booting data includes:
    loading the first security code and the boot loader code from the nonvolatile memory device onto the first core and the second core, respectively; and
    loading the second security code from the nonvolatile memory device onto the first core and loading the firmware codes onto the second core and a remainder of the plurality of cores based on the boot loader code.

18. The method of claim 17, further comprising:
    executing, at the second core and the remainder of the plurality of cores, the loaded firmware codes, respectively; and
    performing, at the first core, attestation of the loaded firmware codes.

19. An operating method of a storage device which includes a nonvolatile memory device and a memory controller configured to control the nonvolatile memory device and including a plurality of cores, the method comprising:
    authenticating, at a first core of the plurality of cores, a first security code and a boot loader code of booting data stored in the nonvolatile memory device;
    when the authentication of the first security code and the boot loader code succeeds, generating, at the first core of the plurality of cores, a device identifier based on a result of measuring the first security code and the boot loader code;
    when the authentication of the first security code and the boot loader code succeeds, loading, at a second core of the plurality of cores, the first security code and the boot loader code from the nonvolatile memory device onto the first core and the second core, respectively;
    authenticating, at the first core of the plurality of cores, a second security code and firmware codes of the booting data;
    when the authentication of the second security code and the firmware codes succeeds, generating, at the first core of the plurality of cores, a first certificate from the device identifier based on the first security code, measuring, at the first core of the plurality of cores, the second security code, and generating a second certificate from the device identifier and a measurement result of the second security code;
    when the authentication of the second security code and the firmware codes succeeds, loading, at the second core of the plurality of cores, the second security code from the nonvolatile memory device onto the first core and the firmware codes onto the second core and a remainder of the plurality of cores based on the boot loader code;
    executing, at the second core and the remainder of the plurality of cores, the loaded firmware codes; and performing, at the first core, attestation of the loaded firmware codes.

\* \* \* \* \*